(12) United States Patent
Brunner et al.

(10) Patent No.: US 7,790,807 B2
(45) Date of Patent: Sep. 7, 2010

(54) FLUOROCARBON TERMINATED OLIGO- AND POLY-CARBONATES AS SURFACE MODIFIERS

(75) Inventors: Martin Brunner, Wallbach (CH); Archana Kishore Desai, Maharashtra (IN); Shrirang Bhikaji Hindalekar, Maharashtra (IN); Suhas Dattatraya Sahasrabudhe, Maharashtra (IN); Armin Schneider, Freiburg (DE); Paragkumar Nathalal Thanki, Maharashtra (IN); Michael Tinkl, Eiken (CH); Alessandro Zedda, Basel (CH); Michèle Gerster, Birsfelden (CH); Fabien Jean Brand, Huningue (FR)

(73) Assignee: Ciba Specialty Chemicals Corp., Tarrytown, NY (US)

( * ) Notice: Subject to any disclaimer, the term of this patent is extended or adjusted under 35 U.S.C. 154(b) by 637 days.

(21) Appl. No.: 10/582,749

(22) PCT Filed: Dec. 8, 2004

(86) PCT No.: PCT/EP2004/053331

§ 371 (c)(1),
(2), (4) Date: Jun. 14, 2006

(87) PCT Pub. No.: WO2005/059006

PCT Pub. Date: Jun. 30, 2005

(65) Prior Publication Data

US 2007/0155854 A1    Jul. 5, 2007

(30) Foreign Application Priority Data

Dec. 19, 2003    (EP)    ................... 03104844

(51) Int. Cl.
*C08L 69/00*    (2006.01)
*C08G 64/10*    (2006.01)
*C08G 64/14*    (2006.01)

(52) U.S. Cl. ....................... 525/147; 525/146; 525/148; 525/439; 525/470; 528/202; 524/281; 558/268

(58) Field of Classification Search ................ None
See application file for complete search history.

(56) References Cited

U.S. PATENT DOCUMENTS 3,036,040 A     5/1962   Lee et al. ....................... 260/47

(Continued)

FOREIGN PATENT DOCUMENTS

EP      0582722      2/1994
EP      0837085      4/1998

(Continued)

OTHER PUBLICATIONS

Derwent Abstract 1989-132627 [18] for JP 01075525, Mar. 22, 1989.

*Primary Examiner*—David Buttner
(74) *Attorney, Agent, or Firm*—Tyler A. Stevenson

(57) ABSTRACT

The instant invention relates to new compounds of the formula I $$R_1-X_1-O\left[\overset{O}{\underset{\|}{C}}-O-\underset{R_6}{\overset{R_5}{\bigcirc}}-R_0-\underset{R_8}{\overset{R_7}{\bigcirc}}-O\right]_m\overset{O}{\underset{\|}{C}}-O-X_2-R_2 \quad (I)$$

wherein $$R_0 \text{ is } \underset{R_4}{\overset{R_3}{\underset{|}{\overset{|}{C}}}}, \ -O-, \ -S-, \ -SO-, \ -SO_2- \text{ or} \quad (IV)$$

$$\underset{\|}{\overset{O}{C}}-, \quad (II)$$

$R_1$ and $R_2$ are each independently of the other a fluorine containing group,
$R_3$ and $R_4$ are each independently of the other hydrogen, a fluorine containing group, $C_1$-$C_{12}$alkyl, phenyl or $$\text{(III)}$$

$R_4$, together with the carbon atom to which they are bonded, form a $C_5$-$C_8$-cycloalkylidene ring that is unsubstituted or substituted by from 1 to 3 $C_1$-$C_4$alkyl groups;
$R_5$, $R_6$, $R_7$ and $R_8$ are each independently of the other hydrogen, $C_1$-$C_{12}$alkyl or $C_3$-$C_{12}$alkenyl,
$X_1$ and $X_2$ are each independently of the other a direct bond or $C_1$-$C_{12}$alkylene,
m is 1 to 10,000, and
n is 0 to 10,000.

These new compounds of the formula I are useful as reducers of surface energy for organic materials such as polycarbonates, polyesters or polyketones or their mixtures, blends or alloys. Polymers with such a reduced surface energy possess an "easy to clean", "self-cleaning" "antisoiling", "soil-release" "antigraffiti", "oil resistance", "solvent resistance", "chemical resistance", "self lubricating", "scratch resistance", "low moisture absorption" and "hydrophobic" surface.

11 Claims, No Drawings

U.S. PATENT DOCUMENTS

| | | | |
|---|---|---|---|
| 4,217,438 A * | 8/1980 | Brunelle et al. | 528/202 |
| 5,403,878 A * | 4/1995 | Ishiwa et al. | 524/158 |
| 6,127,485 A | 10/2000 | Klun et al. | 525/199 |
| 6,214,514 B1 * | 4/2001 | Evans et al. | 430/133 |

FOREIGN PATENT DOCUMENTS

| | | | |
|---|---|---|---|
| JP | 06220182 | * | 8/1994 |
| WO | 01/74946 | | 10/2001 |
| WO | 03/057767 | | 7/2003 |

* cited by examiner

FLUOROCARBON TERMINATED OLIGO- AND POLY-CARBONATES AS SURFACE MODIFIERS

The present invention relates to novel fluorocarbon terminated oligo- and poly-carbonates, to compositions comprising an organic material, preferably a synthetic polymer such as a polycarbonate, polyester, polyacrylate or polymethyacrylate or their mixtures, blends or alloys, and to the novel surface modifiers, as well as the use of the novel compounds as reducer of surface energy of organic materials. Polymers with such a reduced surface energy possess an "easy to clean", "self-cleaning" "antisoiling" "soil-release", "antigraffiti", "oil resistance", "solvent resistance", "chemical resistance", "self lubricating", "scratch resistance", "low moisture absorption" and "hydrophobic" surface.

For articles prepared from thermoplastic polymers in certain areas, there is a definite need for easy self-cleaning properties for thermoplastic glazing, particularly polycarbonate clear sheets and films used in glazing applications. Self-cleaning may occur by rain water running over the surface of a sheet. Easy self-cleaning is important in order to maintain high light transmission properties of transparent or translucent sheet and to minimize build up of unwanted materials on the surface of the sheet. This would also dramatically lower the frequency of cleaning roofing or glazing in buildings, covered walkways, conservatories, automotive and transportation applications, and the like. This would also be advantageous for decorative translucent thermoplastic sheet such as opal white or bronze thermoplastic sheet.

WO-A-03/057767 discloses polycarbonate sheets having on the outer surface a coating composition having a hydroxy-functional silicone modified acrylate polymer additive in sufficient amount. This allows ease of removing solid particles (dirt) and/or liquids on the surface by reducing the adhesion of such particles and/or liquids to the substrate. The contact angle of a water droplet on the commercially available polycarbonate sheet is about 66° and on the treated sheet about 101°.

WO-A-01/74946 discloses dendrimer additives incorporated in thermoplastic resins (such as polycarbonate resins) are effective to alter the surface characteristics of the thermoplastic resin. Such compositions can be injection molded to produce articles in which the dendrimer additive is concentrated at the surface of the article to alter the properties of the resin. By selection of the type of dendrimer additive, the resulting characteristics of the molded article may be controlled.

The use of various fluorochemical compositions on fibers and fibrous substrates, such as for example textiles, carpets, paper, leather and non-woven webs to impart oil and water repellency is known for example in U.S. Pat. No. 6,127,485. This reference discloses hydrophobic and oleophobic fibers, films and molded articles comprising synthetic organic polymer wherein dispersed within the fiber, fabric or molded article and present at the surface of the fiber, fabric or molded article are fluorochemical compounds.

It has now been found that new fluorocarbon terminated oligo- and poly-carbonates are useful for various technical applications such as reducers of surface energy for organic materials, preferably polycarbonates, polyesters, polyacrylates or polymethyacrylates or their mixtures, blends or alloys. Polymers with such a reduced surface energy possess an "easy to clean", "self-cleaning" "antisoiling", "soil-release", "antigraffiti", "oil resistance", "solvent resistance", "chemical resistance", "self lubricating", "scratch resistance", "low moisture absorption" and "hydrophobic" surface.

The present invention therefore provides a compound of the formula I

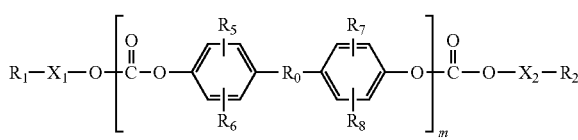

wherein

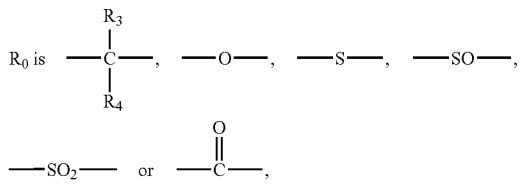

$R_1$ and $R_2$ are each independently of the other a fluorine containing group, $R_3$ and $R_4$ are each independently of the other hydrogen, a fluorine containing group, $C_1$-$C_{12}$alkyl, phenyl or

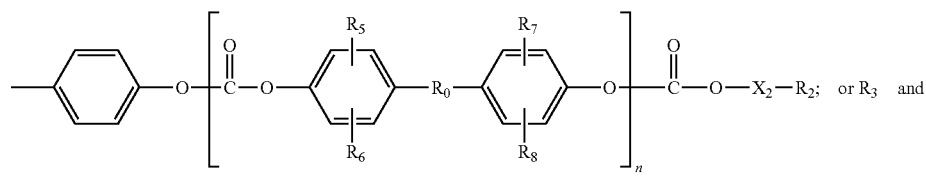

$R_4$, together with the carbon atom to which they are bonded, form a $C_5$-$C_8$-cycloalkylidene ring that is unsubstituted or substituted by from 1 to 3 $C_1$-$C_4$alkyl groups;

$R_5$, $R_6$, $R_7$ and $R_8$ are each independently of the other hydrogen, $C_1$-$C_{12}$alkyl or $C_3$-$C_{12}$alkenyl, $X_1$ and $X_2$ are each independently of the other a direct bond or $C_1$-$C_{12}$alkylene, m is 1 to 10,000, and n is 0 to 10,000.

A fluorine containing group is a branched or unbranched radical, which contains at least one fluoro atom, for example $C_1$-$C_{25}$fluoroalkyl; or $-(CF_2)_pF$, wherein p is 1 to 50.

$C_1$-$C_{25}$Fluoroalkyl is for example perfluoroalkyl, fluoromethyl, 2-fluoroethyl, 3-fluoropropyl, 4-fluorobutyl, 5-fluoropentyl, 6-fluorohexyl, 7-fluoroheptyl, difluoromethyl, trifluoromethyl, pentafluoroethyl, pentafluorobutyl.

Alkyl having up to 12 carbon atoms is a branched or unbranched radical, for example methyl, ethyl, propyl, isopropyl, n-butyl, sec-butyl, isobutyl, tert-butyl, 2-ethylbutyl, n-pentyl, isopentyl, 1-methylpentyl, 1,3-dimethylbutyl, n-hexyl, 1-methylhexyl, n-heptyl, isoheptyl, 1,1,3,3-tetramethylbutyl, 1-methylheptyl, 3-methylheptyl, n-octyl, 2-ethylhexyl, 1,1,3-trimethylhexyl, 1,1,3,3-tetramethylpentyl, nonyl, decyl, undecyl, 1-methylundecyl or dodecyl. One of the preferred definitions for $R_3$ and $R_4$ is, for example, $C_1$-$C_8$alkyl, for example $C_1$-$C_4$alkyl, such as methyl.

A $C_5$-$C_8$cycloalkylidene ring substituted by $C_1$-$C_4$alkyl, which contains preferably from 1 to 3, especially 1 or 2, branched or unbranched alkyl group radicals, is, for example, cyclopentylidene, methylcyclopentylidene, dimethylcyclopentylidene, cyclohexylidene, methylcyclohexylidene, dimethylcyclohexylidene, trimethylcyclohexylidene, tert-butylcyclohexylidene, cycloheptylidene or cyclooctylidene. Preference is given to cyclohexylidene.

$C_1$-$C_{12}$Alkylene is a branched or unbranched radical, for example methylene, ethylene, propylene, trimethylene, tetramethylene, pentamethylene, hexamethylene, heptamethylene, octamethylene, decamethylene or dodecamethylene. One of the preferred definitions for $X_1$ and $X_2$ is $C_1$-$C_8$alkylene, for example $C_2$-$C_8$alkylene. An especially preferred definition for $X_1$ and $X_2$ is $C_2$-$C_4$alkylene, for example ethylene.

Alkenyl having 3 to 14 carbon atoms is a branched or unbranched radical such as, for example, propenyl, 2-butenyl, 3-butenyl, isobutenyl, n-2,4-pentadienyl, 3-methyl-2-butenyl, n-2-octenyl, n-2-dodecenyl or iso-dodecenyl.

Of interest are compounds of the formula I, wherein $R_0$ is

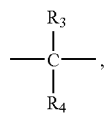

$R_1$ and $R_2$ are each independently of the other a fluorine containing group, $R_3$ and $R_4$ are each independently of the other hydrogen, $CF_3$, $C_1$-$C_{12}$alkyl, phenyl or

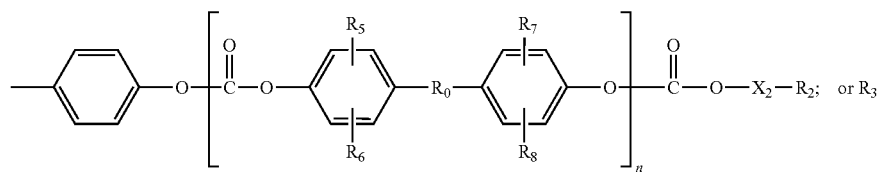

$R_4$, together with the carbon atom to which they are bonded, form a $C_5$-$C_8$-cycloalkylidene ring that is unsubstituted or substituted by from 1 to 3 $C_1$-$C_4$alkyl groups;

$R_5$, $R_6$, $R_7$ and $R_8$ are hydrogen, $X_1$ and $X_2$ are each independently of the other $C_1$-$C_{12}$alkylene, m is 1 to 10,000, and n is 0 to 10,000.

Of interest are also compounds of the formula I, wherein $R_1$ and $R_2$ are each independently of the other —$(CF_2)_pF$, wherein p is 1 to 50.

Of special interest are compounds of the formula I wherein p is 4 to 15.

Of very special interest are compounds of the formula I, wherein $R_0$ is

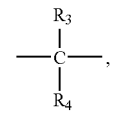

$R_3$ is hydrogen, $CF_3$, $C_1$-$C_{12}$alkyl, phenyl or

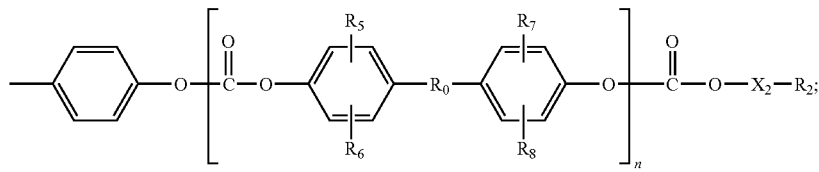

$R_4$ is hydrogen, $CF_3$, $C_1$-$C_{12}$alkyl or phenyl; or $R_3$ and $R_4$, together with the carbon atom to which they are bonded, form a $C_5$-$C_8$-cycloalkylidene ring that is unsubstituted or substituted by from 1 to 3 $C_1$-$C_4$alkyl groups;

$R_5$, $R_6$, $R_7$ and $R_8$ are hydrogen, $X_1$ and $X_2$ are each independently of the other $C_1$-$C_{12}$alkylene, m is 1 to 10,000, and n is 0 to 10,000.

Of interest are also compounds of the formula I, wherein $R_3$ and $R_4$ are each independently of the other hydrogen or $C_1$-$C_4$alkyl; or $R_3$ and $R_4$, together with the carbon atom to which they are bonded, form a cyclohexylidene ring.

Preferred are compounds of the formula I, wherein $X_1$ and $X_2$ are each independently of the other $C_2$-$C_8$alkylene.

Also preferred are compounds of the formula I, wherein m is 1 to 50, and n is 0 to 50.

Of very special interest are compounds of the formula I, wherein $R_0$ is

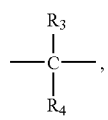

$R_1$ and $R_2$ are each independently of the other —$(CF_2)_pF$, $R_3$ and $R_4$ are each independently of the other $C_1$-$C_4$alkyl; or $R_3$ and $R_4$, together with the carbon atom to which they are bonded, form a cyclohexylidene ring;

$R_5$, $R_6$, $R_7$ and $R_8$ are hydrogen, $X_1$ and $X_2$ are ethylene, m is 2 to 50, n is 0 to 50, and p is 4 to 15.

The compounds of the formula I can be prepared in per se known manner. In a typical reaction procedure, a fluoro alcohol is treated with bis(2,4-dinitrophenyl)carbonate (DNPC) to give in situ 2,4 dinitrophenyl carbonate of the fluoro alcohol. This derivative can easily be isolated and treated separately by for example hydroxy terminated bisphenol A oligomers of various molecular weights. However, for simplicity, the process is preferably carried out in one pot. Brunelle et al., Macromolecules 1991, 24, 3035-3044, discloses the use of bis(2,4-dinitrophenyl)carbonate for preparation of dimer and cyclic oligomers of bisphenol A. The coupling reactions can also be carried out by carbonate linkage forming reagents such as for example phosgene or carbonyl diimidazole (CDI).

Preferred fluoro alcohols are for example fluorotelomer alcohols. These are for example sold by DuPont or Aldrich as Zonyl BA-L (®).

Preferred bisphenol starting materials are for example bisphenol A and the compounds of the formula 1, 2 and 3.

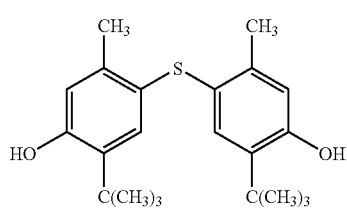
(1)

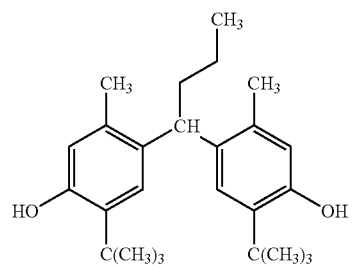
(2)

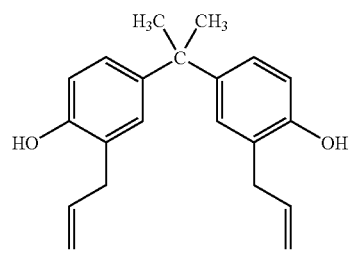
(3)

The compounds of the formula are suitable as reducers of surface energy for organic materials. Polymers with such a reduced surface energy possess an "easy to clean", "self-cleaning" "antisoiling", "soil-release", "antigraffiti", "oil resistance", "solvent resistance", "chemical resistance", "self lubricating", "scratch resistance", "low moisture absorption" and "hydrophobic" surface.

Illustrative Examples of Such Materials Are:

1. Polymers of monoolefins and diolefins, for example polypropylene, polyisobutylene, polybut-1-ene, poly-4-methylpent-1-ene, polyvinylcyclohexane, polyisoprene or polybutadiene, as well as polymers of cycloolefins, for instance of cyclopentene or norbornene, polyethylene (which optionally can be crosslinked), for example high density polyethylene (HDPE), high density and high molecular weight polyethylene (HDPE-HMW), high density and ultra-high molecular weight polyethylene (HDPE-UHMW), medium density polyethylene (MDPE), low density polyethylene (LDPE), linear low density polyethylene (LLDPE), (VLDPE) and (ULDPE).

Polyolefins, i.e. the polymers of monoolefins exemplified in the preceding paragraph, preferably polyethylene and polypropylene, can be prepared by different, and especially by the following, methods:

a) radical polymerisation (normally under high pressure and at elevated temperature.

b) catalytic polymerisation using a catalyst that normally contains one or more than one metal of groups IVb, Vb, VIb or VIII of the Periodic Table. These metals usually have one or more than one ligand, typically oxides, halides, alcoholates, esters, ethers, amines, alkyls, alkenyls and/or aryls that may be either π- or σ-coordinated. These metal complexes may be in the free form or fixed on substrates, typically on activated magnesium chloride, titanium(III) chloride, alumina or silicon oxide. These catalysts may be soluble or insoluble in the polymerisation medium. The catalysts can be used by themselves in the polymerisation or further activators may be used, typically metal alkyls, metal hydrides, metal alkyl halides, metal alkyl oxides or metal alkyloxanes, said metals being elements of groups Ia, IIa and/or IIIa of the Periodic Table. The activators may be modified conveniently with further ester, ether, amine or silyl ether groups. These catalyst systems are usually termed Phillips, Standard Oil Indiana, Ziegler (-Natta), TNZ (DuPont), metallocene or single site catalysts (SSC).

2. Mixtures of the polymers mentioned under 1), for example mixtures of polypropylene with polyisobutylene, polypropylene with polyethylene (for example PP/HDPE, PP/LDPE) and mixtures of different types of polyethylene (for example LDPE/HDPE).

3. Copolymers of monoolefins and diolefins with each other or with other vinyl monomers, for example ethylene/propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, ethylene/vinylcyclohexane copolymers, ethylene/cycloolefin copolymers (e.g. ethylene/norbornene like COC), ethylene/1-olefins copolymers, where the 1-olefin is generated in-situ; propylene/butadiene copolymers, isobutylene/isoprene copolymers, ethylene/vinylcyclohexene copolymers, ethylene/alkyl acrylate copolymers, ethylene/alkyl methacrylate copolymers, ethylene/vinyl acetate copolymers or ethylene/acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned in 1) above, for example polypropylene/ethylene-propylene copolymers, LDPE/ethylene-vinyl acetate copolymers (EVA), LDPE/ethylene-acrylic acid copolymers (EAA), LLDPE/EVA, LLDPE/EAA and alternating or random polyalkylene/carbon monoxide copolymers and mixtures thereof with other polymers, for example polyamides.

4. Hydrocarbon resins (for example $C_5$-$C_9$) including hydrogenated modifications thereof (e.g. tackifiers) and mixtures of polyalkylenes and starch.

Homopolymers and copolymers from 1.)-4.) may have any stereostructure including syndiotactic, isotactic, hemi-isotactic or atactic; where atactic polymers are preferred. Stereoblock polymers are also included.

5. Polystyrene, poly(p-methylstyrene), poly(α-methylstyrene).

6. Aromatic homopolymers and copolymers derived from vinyl aromatic monomers including styrene, α-methylstyrene, all isomers of vinyl toluene, especially p-vinyltoluene, all isomers of ethyl styrene, propyl styrene, vinyl biphenyl, vinyl naphthalene, and vinyl anthracene, and mixtures thereof. Homopolymers and copolymers may have any stereostructure including syndiotactic, isotactic, hemi-isotactic or atactic; where atactic polymers are preferred. Stereoblock polymers are also included.

6a. Copolymers including aforementioned vinyl aromatic monomers and comonomers selected from ethylene, propylene, dienes, nitriles, acids, maleic anhydrides, maleimides, vinyl acetate and vinyl chloride or acrylic derivatives and mixtures thereof, for example styrene/butadiene, styrene/acrylonitrile, styrene/ethylene (interpolymers), styrene/alkyl methacrylate, styrene/butadiene/alkyl acrylate, styrene/butadiene/alkyl methacrylate, styrene/maleic anhydride, styrene/acrylonitrile/methyl acrylate; mixtures of high impact strength of styrene copolymers and another polymer, for example a polyacrylate, a diene polymer or an ethylene/propylene/diene terpolymer; and block copolymers of styrene such as styrene/butadiene/styrene, styrene/isoprene/styrene, styrene/ethylene/butylene/styrene or styrene/ethylene/propylene/styrene.

6b. Hydrogenated aromatic polymers derived from hydrogenation of polymers mentioned under 6.), especially including polycyclohexylethylene (PCHE) prepared by hydrogenating atactic polystyrene, often referred to as polyvinylcyclohexane (PVCH).

6c. Hydrogenated aromatic polymers derived from hydrogeration of polymers mentioned under 6a.).

Homopolymers and copolymers may have any stereostructure including syndiotactic, isotactic, hemi-isotactic or atactic; where atactic polymers are preferred. Stereoblock polymers are also included.

7. Graft copolymers of vinyl aromatic monomers such as styrene or α-methylstyrene, for example styrene on polybutadiene, styrene on polybutadiene-styrene or polybutadiene-acrylonitrile copolymers; styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleimide on polybutadiene; styrene and maleimide on polybutadiene; styrene and alkyl acrylates or methacrylates on polybutadiene; styrene and acrylonitrile on ethylene/propylene/diene terpolymers; styrene and acrylonitrile on polyalkyl acrylates or polyalkyl methacrylates, styrene and acrylonitrile on acrylate/butadiene copolymers, as well as mixtures thereof with the copolymers listed under 6), for example the copolymer mixtures known as ABS, MBS, ASA or AES polymers.

8. Halogen-containing polymers such as polychloroprene, chlorinated rubbers, chlorinated and brominated copolymer of isobutylene-isoprene (halobutyl rubber), chlorinated or sulfo-chlorinated polyethylene, copolymers of ethylene and chlorinated ethylene, epichlorohydrin homo- and copolymers, especially polymers of halogen-containing vinyl compounds, for example polyvinyl chloride, polyvinylidene chloride, polyvinyl fluoride, polyvinylidene fluoride, as well as copolymers thereof such as vinyl chloride/vinylidene chloride, vinyl chloride/vinyl acetate or vinylidene chloride/vinyl acetate copolymers.

9. Polymers derived from α,β-unsaturated acids and derivatives thereof such as polyacrylates and polymethacrylates; polymethyl methacrylates, polyacrylamides and polyacrylonitriles, impact-modified with butyl acrylate.

10. Copolymers of the monomers mentioned under 9) with each other or with other unsaturated monomers, for example acrylonitrile/butadiene copolymers, acrylonitrile/alkyl acrylate copolymers, acrylonitrile/alkoxyalkyl acrylate or acrylonitrile/vinyl halide copolymers or acrylonitrile/alkyl methacrylate/butadiene terpolymers.

11. Polymers derived from unsaturated alcohols and amines or the acyl derivatives or acetals thereof, for example polyvinyl alcohol, polyvinyl acetate, polyvinyl stearate, polyvinyl benzoate, polyvinyl maleate, polyvinyl butyral, polyallyl phthalate or polyallyl melamine; as well as their copolymers with olefins mentioned in 1) above.

12. Homopolymers and copolymers of cyclic ethers such as polyalkylene glycols, polyethylene oxide, polypropylene oxide or copolymers thereof with bisglycidyl ethers.

13. Polyacetals such as polyoxymethylene and those polyoxymethylenes which contain ethylene oxide as a comonomer; polyacetals modified with thermoplastic polyurethanes, acrylates or MBS.

14. Polyphenylene oxides and sulfides, and mixtures of polyphenylene oxides with styrene polymers or polyamides.

15. Polyurethanes derived from hydroxyl-terminated polyethers, polyesters or polybutadienes on the one hand and aliphatic or aromatic polyisocyanates on the other, as well as precursors thereof.

16. Polyamides and copolyamides derived from diamines and dicarboxylic acids and/or from aminocarboxylic acids or the corresponding lactams, for example polyamide 4, polyamide 6, polyamide 6/6, 6/10, 6/9, 6/12, 4/6, 12/12, polyamide 11, polyamide 12, aromatic polyamides starting from m-xylene diamine and adipic acid; polyamides prepared from hexamethylenediamine and isophthalic or/and terephthalic acid and with or without an elastomer as modifier, for example poly-2,4,4,-trimethylhexamethylene terephthalamide or poly-m-phenylene isophthalamide; and also block copolymers of the aforementioned polyamides with polyolefins, olefin copolymers, ionomers or chemically bonded or grafted elastomers; or with polyethers, e.g. with polyethylene glycol, polypropylene glycol or polytetramethylene glycol; as well as polyamides or copolyamides modified with EPDM or ABS; and polyamides condensed during processing (RIM polyamide systems).

17. Polyureas, polyimides, polyamide-imides, polyetherimids, polyesterimids, polyhydantoins and polybenzimidazoles.

18. Polyesters derived from dicarboxylic acids and diols and/or from hydroxycarboxylic acids or the corresponding lactones, for example polyethylene terephthalate, polybutylene terephthalate, poly-1,4-dimethylolcyclohexane terephthalate, polyalkylene naphthalate (PAN) and polyhydroxybenzoates, as well as block copolyether esters derived from hydroxyl-terminated polyethers; and also polyesters modified with polycarbonates or MBS.

19. Polycarbonates and polyester carbonates.

20. Polysulfones, polyether sulfones and polyether ketones.

21. Crosslinked polymers derived from aldehydes on the one hand and phenols, ureas and melamines on the other hand, such as phenol/formaldehyde resins, urea/formaldehyde resins and melamine/formaldehyde resins.

22. Drying and non-drying alkyd resins.

23. Unsaturated polyester resins derived from copolyesters of saturated and unsaturated dicarboxylic acids with polyhydric alcohols and vinyl compounds as crosslinking agents, and also halogen-containing modifications thereof of low flammability.

24. Crosslinkable acrylic resins derived from substituted acrylates, for example epoxy acrylates, urethane acrylates or polyester acrylates.

25. Alkyd resins, polyester resins and acrylate resins crosslinked with melamine resins, urea resins, isocyanates, isocyanurates, polyisocyanates or epoxy resins.

26. Crosslinked epoxy resins derived from aliphatic, cycloaliphatic, heterocyclic or aromatic glycidyl compounds, e.g. products of diglycidyl ethers of bisphenol A and bisphenol F, which are crosslinked with customary hardeners such as anhydrides or amines, with or without accelerators.

27. Natural polymers such as cellulose, rubber; gelatin and chemically modified homologous derivatives thereof, for example cellulose acetates, cellulose propionates and cellulose butyrates, or the cellulose ethers such as methyl cellulose; as well as rosins and their derivatives.

28. Blends and alloys of the aforementioned polymers (polyblends), for example PP/EPDM, Polyamide/EPDM or ABS, PVC/EVA, PVC/ABS, PVC/MBS, PC/ABS, PC/Polyester, PBTP/-ABS, PC/ASA, PC/PBT, PVC/CPE, PVC/acrylates, POM/thermoplastic PUR, PC/thermoplastic PUR, POM/acrylate, POM/MBS, PPO/HIPS, PPO/PA 6.6 and copolymers, PA/HDPE, PA/PP, PA/PPO, PBT/PC/ABS or PBT/PET/PC.

29. Naturally occurring and synthetic organic materials which are pure monomeric compounds or mixtures of such compounds, for example mineral oils, animal and vegetable fats, oil and waxes, or oils, fats and waxes based on synthetic esters (e.g. phthalates, adipates, phosphates or trimellitates) and also mixtures of synthetic esters with mineral oils in any weight ratios, typically those used as spinning compositions, as well as aqueous emulsions of such materials.

30. Aqueous emulsions of natural or synthetic rubber, e.g. natural latex or latices of carboxylated styrene/butadiene copolymers.

Further objects of the invention are therefore compositions comprising a) an organic material which is susceptible to oxidative, thermal or light-induced degradation, and b) at least one compound of the formula I.

Preferred organic materials are natural, semi-synthetic or, preferably, synthetic polymers.

Particularly referred organic materials are synthetic polymers, most preferably thermoplastic polymers. Especially preferred organic materials are polycarbonates, polyesters, polyacrylates or polymethacrylates or their mixtures, blends or alloys.

Polyesters (PES) may be homo- or copolyesters which are composes of aliphatic, cycloaliphatic or aromatic dicarboxylic acids and diols or hydroxycarboxylic acids.

The aliphatic dicarboxylic acids may contain 2 to 40 carbon atoms, the cycloaliphatic dicarboxylic acids may contain 6 to 10 carbon atoms, the aromatic dicarboxylic acids may contain 8 to 14 carbon atoms, the aliphatic hydroxycarboxylic acids may contain 2 to 12 carbon atoms, and the aromatic as well as the cycloaliphatic hydroxycarboxylic acids may contain 7 to 14 carbon atoms.

The aliphatic diols may contain 2 to 12 carbon atoms, the cycloaliphatic diols may contain 5 to 8 carbon atoms, and the aromatic diols can contain 6 to 16 carbon atoms.

Aromatic diols are those, wherein two hydroxyl groups are bound to one or different aromatic hydrocarbon radicals.

It is also possible that the polyesters are branched with small amounts, e.g. from 0.1 to 3 mol %, based on the dicarboxylic acids present, of more than difunctonal monomers (e.g. pentaerythritol, trimellitic acid, 1,3,5-tri(hydroxyphenyl)benzene, 2,4-dihydroxybenzoic acid or 2-(4-hydroxyphenyl)2-(2,4-dihydroxyphenyl)propane).

In polyesters consisting of at least 2 monomers, these can be randomly distributed or may be block copolymers.

Suitable dicarboxylic acids are linear and branched saturated aliphatic dicarboxylic acids, aromatic dicarboxylic acids, and cycloaliphatic dicarboxylic acids.

Aliphatic dicarboxylic acids are suitably those containing 2 to 40 carbon atoms, typically oxalic acid, malonic acid, dimethylmalonic acid, succinic acid, pimelic acid, adipic acid, trimethyladipic acid, sebacic acid, azelaic acid and dimeric acids (dimerisation products of unsaturated aliphatic carboxylic acids such as oleic acid), alkylated malonic and succinic acids such as octadecylsuccinic acid.

Suitable cycloaliphatic dicarboxylic acids are: 1,3-cyclobutanedicarboxylic acid, 1,3-cyclopentanedicarboxylic acid, 1,3- and 1,4-cyclohexanedicarboxylic acid, 1,3- and 1,4-dicarboxylmethyl)cyclohexane, 4,4'-dicyclohexyldicarboxylic acid.

Suitable aromatic dicarboxylic acids are: Preferably terephthalic acid, isophthalic acid, o-phthalic acid as well as 1,3-, 1,4-, 2,6- or 2,7-naphthalenedicarboxylic acid, 4,4'-diphenyldicarboxylic acid, 4,4'-diphenylsulfonedicarboxylic acid, 4,4'-benzophenonedicarboxylic acid, 1,1,3-trimethyl-5-carboxyl-3-(p-carboxylphenyl)indane, 4,4'-diphenyl; ether dicarboxylic acid, bis-p(carboxylphenyl)methane, or bis-p(carboxylphenyl)ethane.

The aromatic dicarboxylic acids are preferred and of these, in particular, terephthalic acid, isophthalic acid and 2,6-naphthalenedicarboxylic acid.

Further suitable dicarboxylic acids are those containing —CO—NH groups; they are disclosed in DE-A-2 414 349. Dicarboxylic acids containing N-heterocyclic rings are also suitable, for example those which are derived from carboxylalkylated, carboxylphenylated or carboxybenzylated monoamine-s-triazinedicarboxylic acids (see DE-A-2 121 184 and 2 533 675), mono- or bishydantoins, benzimidazoles which may be halogenated, or parabanic acid. The carboxyalkyl groups can in this case contain 3 to 20 carbon atoms.

Suitable aliphatic diols are the linear and branched aliphatic glycols, preferably those of 2 to 12, preferably 2 to 6, carbon atoms in the molecule, for example: ethylene glycol, 1,2- and 1,3-propylene glycol, 1,2-, 1,3-, 2,3- or 1,4-butanediol, pentyl glycol, neopentyl glycol, 1,6-hexanediol, 1,12-dodecanediol. A suitable cycloaliphatic diol is, for example, 1,4-dihydroxy-cyclohexane. Further suitable aliphatic diols are typically 1,4-bis(hydroxymethyl)cyclohexane, aromatic-aliphatic diols, such as p-xylylene glycol or 2,5-dichloro-p-xylylene glycol, 2,2-(β-hydroxyethoxyphenyl)propane as well as polyoxyalkylene glycols, such as diethylene glycol, triethylene glycol, polyethylene glycol or polypropylene glycol. The alkylenediols are preferably linear and preferably contain 2 to 4 carbon atoms.

Preferred diols are the alkylenediols, 1,4-dihydroxycyclohexane and 1,4-bis(hydroxymethyl)cyclohexane. Ethylene glycol, 1,4-butanediol as well as 1,2- and 1,3-propylene glycol are particularly preferred.

Further suitable aliphatic diols are the β-hydroxyalkylated, preferably β-hydroxyethylated, bisphenols such as 2,2-bis[4'-(β-hydroxyethoxy)phenyl]propane. Further bisphenols as indicated later.

Another group of suitable aliphatic diols are the heterocyclic diols disclosed in the German specifications 1 812 003, 2 342 432, 2 342 372 and 2 453 326. Illustrative examples are: N,N'-bis(β-hydroxyethyl)-5,5-dimethylhydantoin, N,N'-bis(β-hydroxypropyl)-5,5-dimethyl-hydantoin, methylenebis[N-(β-hydroxyethyl)-5-methyl-5-ethylhydantoin], methylenebis[N-(β-hydroxyethyl)-5,5-dimethylhydantoin], N,N'-bis(β-hydroxyethyl)benzimidazolone, N,N'-bis(β-hydroxyethyl)-(tetrachloro)benzimidazolone, or N,N'-bis(β-hydroxyethyl)-(tetrabromo)benzimidazolone.

Suitable aromatic diols are mononuclear diphenols and, preferably, binuclear diphenols, which carry a hydroxyl group at each aromatic nucleus. Aromatic will preferably be understood as meaning aromatic hydrocarbon radicals such as phenylene or naphthylene. In addition to, for example, hydroquinone, resorcinol or 1,5-, 2,6- and 2,7-dihydroxynaphthalene, those bisphenols merit particular mention which can be illustrated by the following formulae:

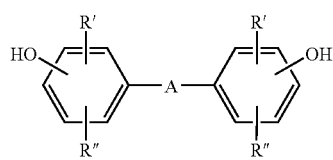

-continued

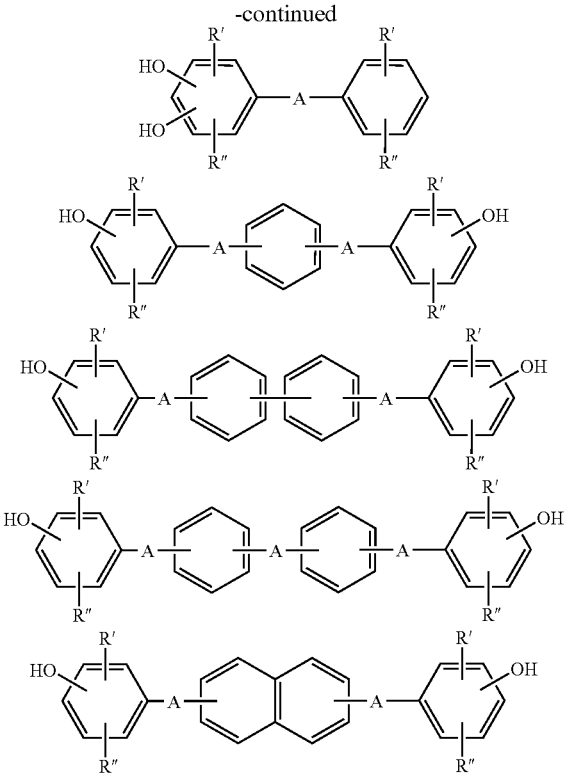

The hydroxyl groups can be in m-position, preferably in p-position, R' and R" in these formulae may be alkyl of 1 to 6 carbon atoms, halogen such as chloro or bromo and, preferably, hydrogen atoms. A can be a direct bond, or oxygen, sulfur,

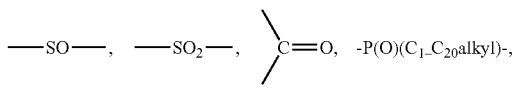

unsubstituted or substituted alkylidene, cycloalkylidene or alkylene.

Typical examples of unsubstituted or substituted alkylidene are ethylidene, 1,1- or 2,2-propylidene, 2,2-butylidene, 1,1-isobutylidene, pentylidene, hexylidene, heptylidene, octylidene, dichloroethylidene, trichloroethylidene.

Typical examples of unsubstituted or substituted alkylene are methylene, ethylene, phenylmethylene, diphenylmethylene, methylphenylmethylene. Typical examples of cycloalkylidene are cyclopentylidene, cyclohexylidene, cycloheptylidene and cyclooctylidene.

Illustrative examples of bisphenols are: bis(p-hydroxyphenyl)ether or bis(p-hydroxyphenyl)-thioether, bis(p-hydroxyphenyl)sulfone, bis(p-hydroxyphenyl)methane, bis(4-hydroxyphenyl)-2,2'-biphenyl, phenylhydroquinone, 1,2-bis(p-hydroxyphenyl)ethane, 1-phenyl-bis(p-hydroxyphenyl)methane, diphenyl-bis(p-hydroxyphenyl)methane, diphenyl-bis(p-hydroxyphenyl)-ethane, bis(3,5-dimethyl-4-hydroxyphenyl)sulfone, bis(3,5-dimethyl-4-hydroxyphenyl)-p-di-isopropylbenzene, bis(3,5-dimethyl-4-hydroxyphenyl)-m-diisopropylbenzene, 2,2-bis(3',5'-dimethyl4'-hydroxyphenyl)propane, 1,1- or 2,2-bis(p-hydroxyphenyl)butane, 2,2-bis(p-hydroxyphenyl)

hexafluoropropane, 1,1-dichloro- or 1,1,1-trichloro-2,2-bis (p-hydroxyphenyl)ethane, 1,1-bis(p-hydroxyphenyl) cyclopentane and, preferably, 2,2-bis(p-hydroxyphenyl) propane (bisphenol A) and 1,1-bis(p-hydroxyphenyl) cyclohexane (bisphenol C).

Suitable polyesters of hydroxycarboxylic acids are typically polycaprolactone, polypivalolactone or the polyesters of 4-hydroxycyclohexanecarboxylic acid or 4-hydroxybenzoic acid.

Polymers which are also suitable are those predominantly containing ester bonds, but which can also contain other bonds, e.g. polyester amides or polyester imides.

Polyesters containing aromatic dicarboxylic acids have become of the greatest importance, especially the polyalkylene terephthalates. Those novel moulding compounds are therefore preferred, wherein the polyester is composed of at least 30 mol %, preferably of at least 40 mol %, of aromatic dicarboxylic acids, and of at least 30 mol %, preferably of at least 40 mol %, of alkylenediols which preferably contain 2 to 12 carbon atoms, based on the polyester.

In this case the alkylenediol is preferably linear and contains 2 to 6 carbon atoms, typically ethylene-, tri-, tetra- or hexamethylene glycol, and the aromatic dicarboxylic acid terephthalic acid and/or isophthalic acid.

Particularly suitable polyesters are PEN, PTT, PET, PETG (glycol-modified polyethylene terephthalate) or PBT and corresponding copolymers or blends thereof. PET and its copolymers are particularly preferred.

As esters of carboxylic acid, polycarbonates (PC) are the simplest polyesters. Polycarbonates are obtained, for example from bisphenol A and phosgene or phosgene-analogon such as trichloromethylchloroformate, triphosgene or diphenylcarbonate by condensation, in the latter case usually with addition of a suitable transesterification catalyst, for example a boron hydride, an amine, e.g. 2-methylimidazole, or a quaternary ammonium salt. In addition to bisphenol A, other bisphenol components can also be used, and it is also possible to use monomers which are halogenated in the benzene nucleus. Particularly suitable bisphenol components to be mentioned are: 2,2-bis(4'-hydroxyphenyl)propane (bisphenol A), 2,4'-di-hydroxydiphenylmethane, bis(2-hydroxyphenyl)methane, bis(4-hydroxyphenyl)methane, bis-(4-hydroxy-5-propylphenyl)methane, 1,1-bis(4'-hydroxyphenyl)ethane, bis(4-hydroxyphenyl)-cyclohexylmethane, 2,2-bis(4'-hydroxyphenyl)-1-phenylpropane, 2,2-bis(3',5'-dimethyl-4'-hydroxyphenyl)propane, 2,2,-bis(3',5'-dibromo4'-hydroxyphenyl)propane, 2,2-bis(3',5'-dichloro-4'-hydroxyphenyl)propane, 1,1-bis(4'-hydroxyphenyl) cyclododecane, 1,1-bis(3',5'-dimethyl-4'-hydroxyphenyl) cyclododecane, 1,1-bis(4'-hydroxyphenyl)-3,3,5-trimethylcyclohexane, 1,1-bis(4'-hydroxyphenyl)-3,3,5,5-tetramethylcyclohexane or 1,1-bis(4'-hydroxyphenyl)-3,3,5-trimethylcyclopentane. The polycarbonates can be branched by suitable amounts of more than difunctional monomers (examples as stated above).

In addition to blends of PES and PC, i.e. in particular PBT/PC and PET/PC, polymers to be used according to this invention are suitably also PC/ABS and ternary blends, such as blends of PBT/PC/ABS, PBT/PET/PC, PBT/PET/PC/ABS or PBT/PC/ASA.

The blends are prepared in customary manner from the starting polymers. The preferred PES component is PBT and the preferred PC component is a PC based on bisphenolA. The ratio of PES to PC is preferably from 95:5 to 5:95, a ratio wherein one component provides at least 70% being particularly preferred.

Owing to transesterification reactions, all PES/PC blends usually comprise are more or less large proportion of block copolymer structures, i.e. part of the blend is in the form of a PC/PES block copolymer. The inventive enhancement of the properties increases the compatibility of the polymers with one another. However, it is also possible to increase the compatibility with so-called compatibilisers. In the present case, these may be, for example, polyester/polycarbonate copolymers or also polyarylates (=aromat. polyester).

To be singled out for special mention is the efficacy of the novel compounds of the formula I as reducers of surface energy of the organic materials. Organic materials with low surface energy have intrinsically better properties like for example water and oil repellency, hydrophobicity, barrier properties, easy to clean, self cleaning, antigraffiti or solvent resistance.

The compounds of the formula I will preferably be added to the organic material to be treated in concentrations of 0.1 to 20%, preferably 0.1 to 10%, typically 1 to 5%, based on the weight of said material.

In addition to comprising the compounds of the formula I, the inventive compositions may comprise further additives, typically the following:

1. Antioxidants 1.1. Alkylated monophenols, for example 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-($\alpha$-methylcyclohexyl)4,6-dimethylphenol, 2,6-dioctadecyl-4-methylphenol, 2,4,6-tricyclohexylphenol, 2,6-di-tert-butyl-4-methoxymethylphenol, nonylphenols which are linear or branched in the side chains, for example 2,6-di-nonyl-4-methylphenol, 2,4-dimethyl-6-(1'-methylundec-1'-yl)phenol, 2,4-dimethyl-6-(1'-methylheptadec-1'-yl) phenol, 2,4-dimethyl-6-(1'-methyltridec-1'-yl)phenol and mixtures thereof.

1.2. Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-di-dodecylthiomethyl-4-nonylphenol.

1.3. Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis (3,5-di-tert-butyl-4-hydroxyphenyl) adipate.

1.4. Tocopherols, for example $\alpha$-tocopherol, $\beta$-tocopherol, $\gamma$-tocopherol, $\delta$-tocopherol and mixtures thereof (vitamin E).

1.5. Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-di-sec-amylphenol), 4,4'-bis(2,6-dimethyl-4-hydroxyphenyl)-disulfide.

1.6. Alkylidenebisphenols, for example 2,2'-methylenebis (6-tert-butyl-4-methylphenol), 2,2'-methylenebis(6-tert-butyl-4-ethylphenol), 2,2'-methylenebis[4-methyl-6-($\alpha$-methylcyclohexyl)-phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis [6-($\alpha$-methylbenzyl)4-nonylphenol], 2,2'-methylenebis[6-($\alpha$,$\alpha$-dimethylbenzyl)4-nonylphenol], 4,4'-methylenebis(2, 6-di-tert-butylphenol), 4,4'-methylenebis(6-tert-butyl-2- methylphenol), 1,1-bis(5-tert-butyl-4-hydroxy-2-methylphenyl)butane, 2,6-bis(3-tert-butyl-5-methyl-2-hydroxybenzyl)4-methylphenol, 1,1,3-tris(5-tert-butyl-4-hydroxy-2-methylphenyl)butane, 1,1-bis(5-tert-butyl-4-hydroxy-2-methylphenyl)-3-n-dodecylmercaptobutane, ethylene glycol bis[3,3-bis(3'-tert-butyl-4'-hydroxyphenyl)butyrate], bis(3-tert-butyl-4-hydroxy-5-methyl-phenyl)dicyclopentadiene, bis[2-(3'-tert-butyl-2'-hydroxy-5'-methylbenzyl)-6-tert-butyl-4-methylphenyl]terephthalate, 1,1-bis-(3,5-dimethyl-2-hydroxyphenyl)butane, 2,2-bis(3,5-di-tert-butyl-4-hydroxyphenyl)propane, 2,2-bis-(5-tert-butyl-4-hydroxy-2-methylphenyl)-4-n-dodecylmercaptobutane, 1,1,5,5-tetra (5-tert-butyl-4-hydroxy-2-methylphenyl)pentane.

1.7. O-, N- and S-benzyl compounds, for example 3,5,3',5'-tetra-tert-butyl-4,4'-dihydroxydibenzyl ether, octadecyl-4-hydroxy-3,5-dimethylbenzylmercaptoacetate, tridecyl4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxybenzyl)sulfide, isooctyl-3,5-di-tert-butyl-4-hydroxybenzylmercaptoacetate.

1.8. Hydroxybenzylated malonates, for example dioctadecyl-2,2-bis(3,5-di-tert-butyl-2-hydroxybenzyl)malonate, di-octadecyl-2-(3-tert-butyl-4-hydroxy-5-methylbenzyl)malonate, di-dodecylmercaptoethyl-2,2-bis(3,5-di-tert-butyl-4-hydroxybenzyl)malonate, bis[4-(1,1,3,3-tetramethylbutyl)phenyl]-2,2-bis(3,5-di-tert-butyl-4-hydroxybenzyl) malonate.

1.9. Aromatic hydroxybenzyl compounds, for example 1,3,5-tris(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol.

1.10. Triazine compounds, for example 2,4-bis(octylmercapto)6-(3,5-di-tert-butyl-4-hydroxanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris-(3,5-di-tert-butyl-4-hydroxyphenoxy)1,2,3-triazine, 1,3,5-tris(3,5-di-tert-butyl-4-hydroxybenzyl)isocyanurate, 1,3,5-tris(4-tert-butyl-3-hydroxy-2,6-dimethylbenzyl)isocyanurate, 2,4,6-tris-(3,5-di-tert-butyl-4-hydroxyphenylethyl)-1,3,5-triazine, 1,3,5-tris(3,5-di-tert-butyl-4-hydroxyphenylpropionyl)-hexahydro-1,3,5-triazine, 1,3,5-tris(3,5-dicyclohexyl-4-hydroxybenzyl)isocyanurate.

1.11. Benzylphosphonates, for example dimethyl-2,5-di-tert-butyl-4-hydroxybenzylphosphonate, diethyl-3,5-di-tert-butyl-4-hydroxybenzylphosphonate, dioctadecyl3,5-di-tert-butyl-4-hydroxybenzylphosphonate, dioctadecyl-5-tert-butyl-4-hydroxy-3-methylbenzylphosphonate, the calcium salt of the monoethyl ester of 3,5-di-tert-butyl-4-hydroxybenzylphosphonic acid.

1.12. Acylaminophenols, for example 4-hydroxylauranilide, 4-hydroxystearanilide, octyl N-(3,5-di-tert-butyl-4-hydroxyphenyl)carbamate.

1.13. Esters of β-(3,5-di-tert-butyl-4-hydroxyphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo [2.2.2]octane.

1.14. Esters of β-(5-tert-butyl-4-hydroxy-3-methylphenyl) propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'bis-(hydroxyethyl)oxamide, 3-thiaundecanol, 3-thiapentadecanol, trimethylhexanediol, trimethylolpropane, 4-hydroxymethyl-1-phospha-2,6,7-trioxabicyclo [2.2.2]octane; 3,9-bis[2-(3-(3-tert-butyl-4-hydroxy-5-methylphenyl)propionyloxy)1,1-dimethylethyl]-2,4,8,10-tetraoxaspiro[5.5]-undecane.

1.15. Esters of β-(3,5-dicyclohexyl-4-hydroxyphenyl)propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, tri-ethylene glycol, pentaerythritol, tris(hydroxyethyl)isocyanurate, N,N'-bis (hydroxyethyl)oxamide, 3-thiaundecanol, 3-thiapentadecanol, trimethylhexanediol, trimethylolpropane, 4-hydroxymethyl-1-phospha-2,6,7-trioxabicyclo [2.2.2]octane.

1.16. Esters of 3,5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis (hydroxyethyl)oxamide, 3-thiaundecanol, 3-thiapentadecanol, trimethylhexanediol, trimethylolpropane, 4-hydroxymethyl-1-phospha-2,6,7-trioxabicyclo [2.2.2]octane.

1.17. Amides of β-(3,5-di-tert-butyl-4-hydroxyphenyl) propionic acid e.g. N,N'-bis(3,5-di-tert-butyl-4-hydroxyphenylpropionyl)hexamethylenediamide, N,N'-bis(3,5-di-tert-butyl-4-hydroxyphenylpropionyl)trimethylenediamide, N,N'-bis(3,5-di-tert-butyl-4-hydroxyphenylpropionyl)hydrazide, N,N'-bis[2-(3-[3,5-di-tert-butyl-4-hydroxyphenyl] propionyloxy)ethyl]oxamide (Naugard®XL-1, supplied by Uniroyal).

1.18. Ascorbic acid (vitamin C)

1.19. Aminic antioxidants, for example N,N'-di-isopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfamoyl)diphenylamine, N,N'-dimethyl-N,N'-di-sec-butyl-p-phenylenediamine, diphenylamine, N-allyldiphenylamine, 4-isopropoxydiphenyl-amine, N-phenyl-1-naphthylamine, N-(4-tert-octylphenyl)-1-naphthylamine, N-phenyl-2-naphthylamine, octylated diphenylamine, for example p,p'-di-tert-octyldiphenylamine, 4-n-butylaminophenol, 4-butyrylaminophenol, 4-nonanoylaminophenol, 4-dodecanoylaminophenol, 4-octadecanoylaminophenol, bis (4-methoxyphenyl)amine, 2,6-di-tert-butyl-4-dimethylamino-methylphenol, 2,4'-diaminodiphenylmethane, 4,4'-diaminodiphenylmethane, N,N,N',N'-tetramethyl4,4'-diaminodiphenylmethane, 1,2-bis[(2-methylphenyl)amino] ethane, 1,2-bis(phenyl-amino)propane, (o-tolyl)biguanide, bis[4-(1',3'-dimethylbutyl)phenyl]amine, tert-octylated N-phenyl-1-naphthylamine, a mixture of mono- and dialkylated tert-butyl/tert-octyldiphenyl-amines, a mixture of mono- and dialkylated nonyldiphenylamines, a mixture of mono- and dialkylated dodecyldiphenylamines, a mixture of mono- and dialkylated isopropyl/isohexyl-diphenylamines, a mixture of mono- and dialkylated tert-butyldiphenylamines, 2,3-dihydro-3,3-dimethyl-4H-1,4-benzothiazine, phenothiazine;, a mixture of mono- and dialkylated tert-butyl/tert-octylphenothiazines, a mixture of mono- and dialkylated tert-octylphenothiazines, N-allylphenothiazine, N,N,N',N'-tetraphenyl-1,4-diaminobut-2-ene, N,N-bis(2,2,6,6-tetramethylpiperid4-yl-hexamethylenediamine, bis(2,2,6,6-tetramethylpiperid-4-yl)sebacate, 2,2,6,6-tetramethylpiperidin4-one, 2,2,6,6-tetramethylpiperidin4-ol.

2. UV Absorbers and Light Stabilizers 2.1. 2-(2'-Hydroxyphenyl)benzotriazoles, for example 2-(2'-hydroxy-5'-methylphenyl)benzotriazole, 2-(3',5'di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chlorobenzotriazole, 2-(3'-tert-butyl-2'-hydroxy-5'-methylphenyl)-5-chlorobenzotriazole, 2-(3'-sec-butyl-5'-tert-butyl-2'-hydroxyphenyl)benzotriazole, 2-(2'-hydroxy4'-octyloxyphenyl)benzotriazole, 2-(3',5'-di-tert-amyl-2'-hydroxyphenyl)benzotriazole, 2-(3',5'-bis(α,α-dimethylbenzyl)-2'-hydroxyphenyl)benzotriazole, 2-(3'-tert-butyl-2'-hydroxy-5'-(2-octyloxycarbonylethyl)phenyl)-5-chlorobenzotriazole, 2-(3'-tert-butyl-5'-[2-(2-ethylhexyl-oxy)carbonylethyl]-2'-hydroxyphenyl)-5-chlorobenzotriazole, 2-(3'-tert-butyl-2'-hydroxy-5'-(2-methoxycarbonylethyl)phenyl)-5-chlorobenzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxycarbonyl-ethyl)phenyl)benzotriazole, 2-(3'-tert-butyl-5'-[2-(2-ethylhexyloxy)carbonylethyl]-2'-hydroxy-phenyl)benzotriazole, 2-(3'-dodecyl-2'-hydroxy-5'-methylphenyl)benzotriazole, 2-(3'-tert-butyl-2'-hydroxy-5'-(2-isooctyloxycarbonylethyl)phenylbenzotriazole, 2,2'-methylenebis[4-(1,1,3,3-tetramethylbutyl)-6-benzotriazole-2-ylphenol]; the transesterification product of 2-[3'-tert-butyl-5'-(2-methoxycarbonylethyl)-2'-hydroxyphenyl]-2H-benzotriazole with polyethylene glycol 300; [R—CH$_2$CH$_2$—COO—CH$_2$CH$_2$—]$_2$, where R=3'-tert-butyl-4'-hydroxy-5'-2H-benzotriazol-2-ylphenyl, 2-[2'-hydroxy-3'-(α,α-dimethylbenzyl)-5'-(1,1,3,3-tetramethylbutyl)phenyl]-benzotriazole; 2-[2'-hydroxy-3'-(1,1,3,3-tetramethylbutyl)-5'-(α,α-dimethylbenzyl)phenyl]benzotriazole.

2.2. 2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

2.3. Esters of substituted and unsubstituted benzoic acids, for example 4-tert-butylphenyl salicylate, phenyl salicylate, octylphenyl salicylate, dibenzoyl resorcinol, bis(4-tert-butylbenzoyl)resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl4,6-di-tert-butylphenyl 3,5-di-tert-butyl-4-hydroxybenzoate.

2.4. Acrylates, for example ethyl α-cyano-β,β-diphenylacrylate, isooctyl α-cyano-β,β-diphenylacrylate, methyl α-carbomethoxycinnamate, methyl α-cyano-β-methyl-p-methoxycinnamate, butyl α-cyano-β-methyl-p-methoxycinnamate, methyl α-carbomethoxy-p-methoxycinnamate and N-(β-carbomethoxy-β-cyanovinyl)-2-methylindoline.

2.5. Nickel compounds, for example nickel complexes of 2,2'-thiobis[4-(1,1,3,3-tetramethylbutyl)phenol], such as the 1:1 or 1:2 complex, with or without additional ligands such as n-butylamine, triethanolamine or N-cyclohexyldiethanolamine, nickel dibutyidithiocarbamate, nickel salts of the monoalkyl esters, e.g. the methyl or ethyl ester, of 4-hydroxy-3,5-di-tert-butylbenzylphosphonic acid, nickel complexes of ketoximes, e.g. of 2-hydroxy-4-methylphenylundecylketoxime, nickel complexes of 1-phenyl-4-lauroyl-5-hydroxypyrazole, with or without additional ligands.

2.6. Sterically hindered amines, for example bis(2,2,6,6-tetramethyl-4-piperidyl)sebacate, bis(2,2,6,6-tetramethyl-4-piperidyl)succinate, bis(1,2,2,6,6-pentamethyl-4-piperidyl)sebacate, bis(1-octyloxy-2,2,6,6-tetramethyl-4-piperidyl)sebacate, bis(1,2,2,6,6-pentamethyl-4-piperidyl) n-butyl-3,5-di-tert-butyl-4-hydroxybenzylmalonate, the condensate of 1-(2-hydroxyethyl)-2,2,6,6-tetramethyl4-hydroxypiperidine and succinic acid, linear or cyclic condensates of N,N'-bis(2,2,6,6-tetramethyl-4-piperidyl)hexamethylenediamine and 4-tert-octylamino-2,6-dichloro-1,3,5-triazine, tris(2,2,6,6-tetramethyl-4-piperidyl)nitrilotriacetate, tetrakis(2,2,6,6-tetramethyl-4-piperidyl)-1,2,3,4-butanetetracarboxylate, 1,1'-(1,2-ethanediyl)-bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl)-malonate, 3-n-octyl-7,7,9,9-tetramethyl-1,3,8-triazaspiro[4.5]decane-2,4-dione, bis(1-octyloxy-2,2,6,6-tetramethylpiperidyl)sebacate, bis(1-octyloxy-2,2,6,6-tetramethylpiperidyl)succinate, linear or cyclic condensates of N,N'-bis(2,2,6,6-tetramethyl-4-piperidyl)hexamethylenediamine and 4-morpholino-2,6-dichloro-1,3,5-triazine, the condensate of 2-chloro-4,6-bis(4-n-butylamino-2,2,6,6-tetramethylpiperidyl)-1,3,5-triazine and 1,2-bis(3-aminopropylamino)-ethane, the condensate of 2-chloro-4,6-di-(4-n-butylamino-1,2,2,6,6-pentamethylpiperidyl)-1,3,5-triazine and 1,2-bis(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidine-2,5-dione, 3-dodecyl-1-(1,2,2,6,6-pentamethyl-4-piperidyl)pyrrolidine-2,5-dione, a mixture of 4-hexadecyloxy- and 4-stearyloxy-2,2,6,6-tetramethylpiperidine, a condensate of N,N'-bis(2,2,6,6-tetramethyl-4-piperidyl)hexamethylenediamine and 4-cyclohexylamino-2,6-dichloro-1,3,5-triazine, a condensate of 1,2-bis(3-aminopropylamino)ethane and 2,4,6-trichloro-1,3,5-triazine as well as 4-butylamino-2,2,6,6-tetramethylpiperidine (CAS Reg. No. [136504-96-6]); a condensate of 1,6-hexanediamine and 2,4,6-trichloro-1,3,5-triazine as well as N,N-dibutylamine and 4-butylamino-2,2,6,6-tetramethylpiperidine (CAS Reg. No. [192268-64-7]); N-(2,2,6,6-tetramethyl-4-piperidyl)n-dodecylsuccinimide, N-(1,2,2,6,6-pentamethyl-4-piperidyl)-n-dodecylsuccinimide, 2-undecyl-7,7,9,9-tetramethyl-1-oxa-3,8-diaza-4-oxospiro[4,5]decane, a reaction product of 7,7,9,9-tetramethyl-2-cycloundecyl-1-oxa-3,8-diaza-4-oxospiro-[4,5]decane and epichlorohydrin, 1,1-bis(1,2,2,6,6-pentamethyl4-piperidyloxycarbonyl)-2-(4-methoxyphenyl)ethene, N,N'-bis-formyl-N,N'-bis(2,2,6,6-tetramethyl-4-piperidyl)hexamethylenediamine, a diester of 4-methoxymethylenemalonic acid with 1,2,2,6,6-pentamethyl-4-hydroxypiperidine, poly[methylpropyl-3-oxy-4-(2,2,6,6-tetramethyl4-piperidyl)]siloxane, a reaction product of maleic acid anhydride-α-olefin copolymer with 2,2,6,6-tetramethyl-4-aminopiperidine or 1,2,2,6,6-pentamethyl-4-aminopiperidine.

2.7. Oxamides, for example 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide, mixtures of o- and p-methoxy-disubsttuted oxanilides and mixtures of o- and p-ethoxy-disubstituted oxanilides.

2.8. 2-(2-Hydroxyphenyl)-1,3,5-triazines, for example 2,4,6-tris(2-hydroxy4-actyloxyphenyl)-1,3,5-triazine, 2-2-hydroxy4-octyloxyphenyl)4,6-bis(2,4-dimethylphenyl)-1,3, 5-triazine, 2-(2,4-dihydroxyphenyl)-4,6-bis(2,4-dimethylphenyl)-1,3,5-triazine, 2,4-bis(2-hydroxy-4-propyloxyphenyl)-6-2,4-dimethylphenyl)-1,3,5-triazine, 2-(2-hydroxy-4-octyloxyphenyl)4,6-bis(4-methylphenyl)-1, 3,5-triazine, 2-(2-hydroxy-4-dodecyloxyphenyl)-4,6-bis(2, 4-dimethylphenyl)-1,3,5-triazine, 2-(2-hydroxy-4-tridecyloxyphenyl)-4,6-bis(2,4-dimethylphenyl)1,3,5-triazine, 2-[2-hydroxy-4-(2-hydroxy-3-butyloxypropoxy)phenyl]-4, 6-bis(2,4-dimethyl)1,3,5-triazine, 2-[2-hydroxy-4-(2-hydroxy-3-octyloxypropyloxy)phenyl]-4,6-bis(2,4-dimethyl)-1,3,5-triazine, 2-[4-(dodecyloxy/tridecyloxy-2-hydroxypropoxy)-2-hydroxyphenyl]-4,6-bis(2,4-dimethylphenyl)-1,3,5-triazine, 2-[2-hydroxy-4-(2-hydroxy-3-dodecyloxypropoxy)phenyl]-4,6-bis(2,4-dimethylphenyl)-1,3,5-triazine, 2-(2-hydroxy-4-hexyloxy) phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxypropoxy)phenyl]-1,3,5-triazine, 2-(2-hydroxyphenyl)-4-(4-methoxyphenyl)6-phenyl-1,3,5-triazine, 2-{2-hydroxy-[3-(2-ethylhexyl-1-oxy)-2-hydroxypropyloxy]phenyl}-4,6-bis(2,4-dimethylphenyl)-1,3,5-triazine, 2-[2-hydroxy4-(2-ethylethoxy)phenyl]-4,6-diphenyl-1,3,5-triazine.

3. Metal deactivators, for example N,N'-diphenyloxamide, N-salicylal-N'-salicyloyl hydrazine, N,N'-bis(salicyloyl)hydrazine, N,N'-bis(3,5-di-tert-butyl-4-hydroxyphenylpropionyl)hydrazine, 3-salicyloylamino-1,2,4-triazole, bis(benzylidene)oxalyl dihydrazide, oxanilide, isophthaloyl dihydrazide, sebacoyl bisphenylhydrazide, N,N'-diacetyladipoyl dihydrazide, N,N'-bis(salicyloyl)oxalyl dihydrazide, N,N'-bis(salicyloyl)thiopropionyl dihydrazide.

4. Phosphites and phosphonites, for example triphenyl phosphite, diphenylalkyl phosphites, phenyldialkyl phosphites, tris(nonylphenyl) phosphite, trilauryl phosphite, trioctadecyl phosphite, distearylpentaerythritol diphosphite, tris(2, 4-di-tert-butylphenyl) phosphite, diisodecyl pentaerythritol diphosphite, bis(2,4-di-tert-butylphenyl)pentaerythritol diphosphite, bis(2,4-dicumylphenyl)pentaerythritol diphosphite, bis(2,6-di-tert-butyl-4-methylphenyl)pentaerythritol diphosphite, diisodecyloxypentaerythritol diphosphite, bis (2,4-di-tert-butyl-6-methylphenyl)-pentaerythritol diphosphite, bis(2,4,6-tris(tert-butylphenyl)pentaerythritol diphosphite, tristearyl sorbitol triphosphite, tetrakis(2,4-di-tert-butylphenyl) 4,4'-biphenylene diphosphonite, 6-isooctyloxy-2,4,8,10-tetra-tert-butyl-12H-dibenz[d,g]-1,3,2-dioxaphosphocin, bis(2,4-di-tert-butyl-6-methylphenyl) methyl phosphite, bis(2,4-di-tert-butyl-6-methylphenyl) ethyl phosphite, 6-fluoro-2,4,8,10-tetra-tert-butyl-12-methyl-dibenz[d,g]-1,3,2-dioxaphosphocin, 2,2'2"-nitrilo-[triethyltris(3,3',5,5'-tetra-tert-butyl-1,1'-biphenyl-2,2'-diyl) phosphite], 2-ethylhexyl(3,3',5,5'-tetra-tert-butyl-1,1'-biphenyl-2,2'-diyl)phosphite, 5-butyl-5-ethyl-2-(2,4,6-tri-tert-butylphenoxy)-1,3,2-dioxaphosphirane.

5. Hydroxylamines, for example N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecylhydroxylamine, N-heptadecyl-N-octadecylhydroxylamine, N,N-dialkylhydroxylamine derived from hydrogenated tallow amine.

6. Nitrones, for example N-benzyl-alpha-phenylnitrone, N-ethyl-alpha-methyinitrone, N-octyl-alpha-heptyinitrone, N-lauryl-alpha-undecyinitrone, N-tetradecyl-alpha-tridecylnitrone, N-hexadecyl-alpha-pentadecylnitrone, N-octadecyl-alpha-heptadecylnitrone, N-hexadecyl-alpha-heptadecylnitrone, N-ocatadecyl-alpha-pentadecylnitrone, N-heptadecyl-alpha-heptadecyinitrone, N-octadecyl-alpha-hexadecylnitrone, nitrone derived from N,N-dialkylhydroxyl-amine derived from hydrogenated tallow amine.

7. Thiosynergists, for example dilauryl thiodipropionate or distearyl thiodipropionate.

8. Peroxide scavengers, for example esters of β-thiodipropionic acid, for example the lauryl, stearyl, myristyl or tridecyl esters, mercaptobenzimidazole or the zinc salt of 2-mercaptobenzimidazole, zinc dibutyldithiocarbamate, dioctadecyl disulfide, pentaerythritol tetrakis(β-dodecylmercapto)propionate.

9. Polyamide stabilizers, for example copper salts in combination with iodides and/or phosphorus compounds and salts of divalent manganese.

10. Basic co-stabilizers, for example melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids, for example calcium stearate, zinc stearate, magnesium behenate, magnesium stearate, sodium ricinoleate and potassium palmitate, antimony pyrocatecholate or zinc pyrocatecholate.

11. Nucleating agents, for example inorganic substances, such as talcum, metal oxides, such as titanium dioxide or magnesium oxide, phosphates, carbonates or sulfates of, preferably, alkaline earth metals; organic compounds, such as mono- or polycarboxylic acids and the salts thereof, e.g. 4-tert-butylbenzoic acid, adipic acid, diphenylacetic acid, sodium succinate or sodium benzoate; polymeric compounds, such as ionic copolymers (ionomers). Especially preferred are 1,3:2,4-bis(3',4'-dimethylbenzylidene)sorbitol, 1,3:2,4-di(paramethyl-dibenzylidene)sorbitol, and 1,3:2,4-di(benzylidene)sorbitol.

12. Fillers and reinforcing agents, for example calcium carbonate, silicates, glass fibres, glass bulbs, asbestos, talc, kaolin, mica, barium sulfate, metal oxides and hydroxides, carbon black, graphite, wood flour and flours or fibers of other natural products, synthetic fibers.

13. Other additives, for example plasticisers, lubricants, emulsifiers, pigments, rheology additives, catalysts, flow-control agents, optical brighteners, flameproofing agents, antistatic agents blowing agents and infrared (IR) adsorbers.

Preferred IR absorbers are for example pigments, dyes or organometallic compounds. Examples of such pigments are for example disclosed in JP-A-2003221523. Examples of IR absorbing dyes are disclosed for example in JP-A-2003327865 or EP-A-1 306 404. IR absorbing organometallic compounds are for example disclosed in EP-A-1 266 931 or Chemical Abstract 117; 112529.

14. Benzofuranones and indolinones, for example those disclosed in U.S. Pat. No. 4,325,863; U.S. Pat. No. 4,338,244; U.S. Pat. No. 5,175,312; U.S. Pat. No. 5,216,052; U.S. Pat. No. 5,252,643; DE-A-4316611; DE-A4316622; DE-A4316876; EP-A-0589839; EP-A-0591102 or EP-A-1291384 or 3-[4-(2-acetoxyethoxy)phenyl]-5,7-di-tert-butylbenzofuran-2-one, 5,7-di-tert-butyl-3-[4-2-stearoyl-oxyethoxy)phenyl]benzofuran-2-one, 3,3'-bis[5,7-di-tert-butyl-3-(4-[2-hydroxyethoxy]phenyl)-benzofuran-2-one], 5,7-di-tert-butyl-3-(4-ethoxyphenyl)benzofuran-2-one, 3-(4-acetoxy-3,5-dimethylphenyl)5,7-di-tert-butylbenzofuran-2-one, 3-(3,5-dimethyl-4-pivaloyloxyphenyl)-5,7-di-tertbutylbenzofuran-2-one, 3-(3,4-dimethylphenyl)-5,7-di-tert-butylbenzofuran-2-one, 3-(2,3-dimethylphenyl)-5,7-di-tert-butylbenzofuran-2-one or 3-(2-acetyl-5-isooctylphenyl)5-iso-octylbenzofuran-2-one.

The further additives are typically used in concentrations of 0.01 to 10%, based on the total weight of the material to be treated.

The novel compounds of the formula I can be used in particular together with phenolic anti-oxidants, light stabilizers and/or processing stabilizers.

Incorporation of component (b) and, if desired, further additives into the synthetic polymers is carried out by known methods, for example before or during compounding, extrusion, co-extrusion or else by applying the dissolved or dispersed compounds to the synthetic polymer, if appropriate with subsequent slow evaporation of the solvent.

The present invention also relates to a composition in the form of a masterbatch or concentrate comprising component (a) in an amount of from 5 to 90% and component (b) in an amount of from 5 to 80% by weight.

Component (b) and, if desired, further additives, can also be added before or during polymerisation or before crosslinking.

Component (b), with or without further additives, can be incorporated in pure form or encapsulated in waxes, oils or polymers into the synthetic polymer.

Component (b), with or without further additives, can also be sprayed onto the synthetic polymer. It is able to dilute other additives (for example the conventional additives indicated above) or their melts so that they too can be sprayed together with these additives onto the polymer. Addition by spraying on during the deactivation of the polymerization catalysts is particularly advantageous, it being possible to carry out spraying using, for example, the steam used for deactivation.

In the case of spherically polymerized polyolefins it may, for example, be advantageous to apply component (b), with or without other additives, by spraying.

The synthetic polymers prepared in this way can be employed in a wide variety of forms, for example as foams, films, fibres, tapes, moulding compositions, as profiles or as binders for coating materials, especially powder coatings, adhesives, putties or especially as thick-layer polyolefin mouldings which are in long-term contact with extractive media, such as, for example, pipes for liquids or gases, films, fibres, geomembranes, tapes, profiles or tanks.

The preferred thick-layer polyolefin mouldings have a layer thickness of from 1 to 50 mm, in particular from 1 to 30 mm, for example from 2 to 10 mm.

The compositions according to the invention can be advantageously used for the preparation of various shaped articles. Examples are:

I-1) Floating devices, marine applications, pontoons, buoys, plastic lumber for decks, piers, boats, kayaks, oars, and beach reinforcements.

I-2) Automotive applications, in particular bumpers, dashboards, battery, rear and front linings, moldings parts under the hood, hat shelf, trunk linings, interior linings, air bag covers, electronic moldings for fittings (lights), panes for dashboards, headlamp glass, instrument panel, exterior linings, upholstery, automotive lights, head lights, parking lights, rear lights, stop lights, interior and exterior trims; door panels; gas tank; glazing front side; rear windows; seat backing, exterior panels, wire insulation, profile extrusion for sealing, cladding, pillar covers, chassis parts, exhaust systems, fuel filter/filler, fuel pumps, fuel tank, body side mouldings, convertible tops, exterior mirrors, exterior trim, fasteners/fixings, front end module, glass, hinges, lock systems, luggage/roof racks, pressed/stamped parts, seals, side impact protection, sound deadener/insulator and sunroof.

I-3) Road traffic devices, in particular sign postings, posts for road marking, car accessories, warning triangles, medical cases, helmets, tires.

I-4) Devices for plane, railway, motor car (car, motorbike) including furnishings.

I-5) Devices for space applications, in particular rockets and satellites, e.g. reentry shields.

I-6) Devices for architecture and design, mining applications, acoustic quietized systems, street refuges, and shelters.

II-1) Appliances, cases and coverings in general and electric/electronic devices (personal computer, telephone, portable phone, printer, television-sets, audio and video devices), flower pots, satellite TV bowl, and panel devices.

II-2) Jacketing for other materials such as steel or textiles.

II-3) Devices for the electronic industry, in particular insulation for plugs, especially computer plugs, cases for electric and electronic parts, printed boards, and materials for electronic data storage such as chips, check cards or credit cards.

II-4) Electric appliances, in particular washing machines, tumblers, ovens (microwave oven), dish-washers, mixers, and irons.

II-5) Covers for lights (e.g. street-lights, lamp-shades).

II-6) Applications in wire and cable (semi-conductor, insulation and cable-jacketing).

II-7) Foils for condensers, refrigerators, heating devices, air conditioners, encapsulating of electronics, semi-conductors, coffee machines, and vacuum cleaners.

III-1) Technical articles such as cogwheel (gear), slide fittings, spacers, screws, bolts, handles, and knobs.

III-2) Rotor blades, ventilators and windmill vanes, solar devices, swimming pools, swimming pool covers, pool liners, pond liners, closets, wardrobes, dividing walls, slat walls, folding walls, roofs, shutters (e.g. roller shutters), filtings, connections between pipes, sleeves, and conveyor belts.

III-3) Sanitary articles, in particular shower cubicles, lavatory seats, covers, and sinks.

III-4) Hygienic articles, in particular diapers (babies, adult incontinence), feminine hygiene articles, shower curtains, brushes, mats, tubs, mobile toilets, tooth brushes, and bed pans.

III-5) Pipes (cross-linked or not) for water, waste water and chemicals, pipes for wire and cable protection, pipes for gas, oil and sewage, guttering, down pipes, and drainage systems.

III-6) Profiles of any geometry (window panes) and siding.

III-7) Glass substitutes, in particular extruded or co-extruded plates, glazing for buildings (monolithic, twin or multiwall), aircraft, schools, extruded sheets, window film for architectural glazing, train, transportation, sanitary articles, and greenhouse.

III-8) Plates (walls, cutting board), extrusion-coating (photographic paper, tetrapack and pipe coating), silos, wood substitute, plastic lumber, wood composites, walls, surfaces, furniture, decorative foil, floor coverings (interior and exterior applications), flooring, duck boards, and tiles.

III-9) Intake and outlet manifolds.

III-10) Cement-, concrete-, composite-applications and covers, siding and cladding, hand rails, banisters, kitchen work tops, roofing, roofing sheets, tiles, and tarpaulins.

IV-1) Plates (walls and cutting board), trays, artificial grass, astroturf, artificial covering for stadium rings (athletics), artificial floor for stadium rings (athletics), and tapes.

IV-2) Woven fabrics continuous and staple, fibers (carpets/hygienic articles/geotextiles/monofilaments; filters; wipes/curtains (shades)/medical applications), bulk fibers (applications such as gown/protection clothes), nets, ropes, cables, strings, cords, threads, safety seat-belts, clothes, underwear, gloves; boots; rubber boots, intimate apparel, garments, swimwear, sportswear, umbrellas (parasol, sunshade), parachutes, paraglides, sails, "balloon-silk", camping articles, tents, airbeds, sun beds, bulk bags, and bags.

IV-3) Membranes, insulation, covers and seals for roofs, tunnels, dumps, ponds, dumps, walls roofing membranes, geomembranes, swimming pools, curtains (shades)/sunshields, awnings, canopies, wallpaper, food packing and wrapping (flexible and solid), medical packaging (flexible & solid), airbags/safety belts, arm- and head rests, carpets, centre console, dashboard, cockpits, door, overhead console module, door trim, headliners, interior lighting, interior mirrors, parcel shelf, rear luggage cover, seats, steering column, steering wheel, textiles, and trunk trim.

V) Films (packaging, dump, laminating, agriculture and horticulture, greenhouse, mulch, tunnel, silage), bale wrap, swimming pools, waste bags, wallpaper, stretch film, raffia, desalination film, batteries, and connectors.

VI-1) Food packing and wrapping (flexible and solid), bottles.

VI-2) Storage systems such as boxes (crates), luggage, chest, household boxes, pallets, shelves, tracks, screw boxes, packs, and cans.

VI-3) Cartridges, syringes, medical applications, containers for any transportation, waste baskets and waste bins, waste bags, bins, dust bins, bin liners, wheely bins, container in general, tanks for water/used water/chemistry/gas/oil/gasoline/diesel; tank liners, boxes, crates, battery cases, troughs, medical devices such as piston, ophthalmic applications, diagnostic devices, and packing for pharmaceuticals blister.

VII-1) Extrusion coating (photo paper, tetrapack, pipe coating), household articles of any kind (e.g. appliances, thermos bottle/clothes hanger), fastening systems such as plugs, wire and cable clamps, zippers, closures, locks, and snap-closures.

VII-2) Support devices, articles for the leisure time such as sports and fitness devices, gymnastics mats, ski-boots, inline-skates, skis, big foot, athletic surfaces (e.g. tennis grounds); screw tops, tops and stoppers for bottles, and cans.

VII-3) Furniture in general, foamed articles (cushions, impact absorbers), foams, sponges, dish clothes, mats, garden chairs, stadium seats, tables, couches, toys, building kits (boards/figures/balls), playhouses, slides, and play vehicles.

VII-4) Materials for optical and magnetic data storage.

VII-5) Kitchen ware (eating, drinking, cooking, storing).

VII-6) Boxes for CD's, cassettes and video tapes; DVD electronic articles, office supplies of any kind (ball-point pens, stamps and ink-pads, mouse, shelves, tracks), bottles of any volume and content (drinks, detergents, cosmetics including perfumes), and adhesive tapes.

VII-7) Footwear (shoes/shoe-soles), insoles, spats, adhesives, structural adhesives, food boxes (fruit, vegetables, meat, fish), synthetic paper, labels for bottles, couches, artificial joints (human), printing plates (flexographic), printed circuit boards, and display technologies.

VII-8) Devices of filled polymers (talc, chalk, china clay (kaolin), wollastonite, pigments, carbon black, $TiO_2$, mica, nanocomposites, dolomite, silicates, glass, asbestos).

Thus, a further embodiment of the present invention relates to a shaped article, in particular a film, pipe, profile, bottle, tank or container, fiber containing a composition as described above.

A further embodiment of the present invention relates to a molded article containing a composition as described above.

The molding is in particular effected by injection, blow, compression, roto-molding or slush-molding or extrusion.

The present invention also relates to a process for reducing the surface energy of organic materials which comprises incorporating therein or applying thereto at least one compound of the formula I.

The preferred compounds of the formula I and optionally further additives, in the process for reducing the surface energy of organic materials are the same as those described for the composition.

A preferred embodiment of the present invention is also the use of a compound of the formula I as reducer of surface energy for organic materials.

The following examples illustrate the invention further. Parts or percentages relate to weight.

EXAMPLE 1

Preparation of a Fluorocarbon Terminated Oligocarbonate from Hydroxy Terminated Bisphenol A Oligomer (n=5) and a Fluoro Alcohol To a solution of 30 g of a fluoro alcohol [Zonyl BA-L (®™); Aldrich] and 29.14 g of bis(2,4-dinitrophenyl)carbonate (DNPC) in 300 ml of dichloromethane is added dropwise a solution of 11.5 ml of triethylamine in 100 ml of dichloromethane at room temperature under stirring during 1 hour. The reaction mixture is further stirred for 15 minutes and then dropped to a solution of 11.5 ml of triethylamine, 0.302 g of 4-(dimethylamino)pyridine and 32 g of oligocarbonate (MW=1328) in 250 ml of dichloromethane during 1.5 hours. The stirring is continued for 15 minutes. Then the solvent is evaporated under vacuum. The residue is treated with 50% aqueous methanol and filtered. The wet cake is further treated with aqueous 50% methanol to remove the colored impurities from the product. The wet cake is dried under vacuum to yield an amorphous white solid, which is characterized by NMR and IR. $^1$H NMR ($\delta$; $CDCl_3$): 1.68 (s, gem-dimethyls); 2.55-2.65 (m, $OCH_2$—$\underline{CH_2}$—$CF_2$); 4.54 (t, $O\underline{CH_2}$—$CH_2$—$CF_2$); 7.06 (d, aromatic protons ortho to end carbonate groups); 7.15-7.26 (2 t, aromatic protons). IR (KBr): 1164.9, 1195.8, 1245.9 (al-$CF_2$); 1768.6 (aryl-O—CO—O-alkyl).

EXAMPLE 2

Preparation of a Fluorocarbon Terminated Oligocarbonate from Hydroxy Terminated Bisphenol A Oligomer (n=8) and a Fluoro Alcohol To a solution of 28 g of fluoro alcohol Zonyl BAI (®™); Aldrich] and 26.67 g of bis(2,4-dinitrophenyl)carbonate (DNPC) in 250 ml of dichloromethane is added dropwise a solution of 10.13 ml of triethylamine in 50 ml of dichloromethane at room temperature under stirring during 1 hour. The reaction mixture is further stirred for 15 minutes and then dropped to a solution of 10.13 ml of triethylamine, 0.25 g of 4-(dimethylamino)pyridine and 50 g of oligo-carbonate (MW=1922) in 300 ml of dichloromethane at room temperature during 1.5 hours. The stirring is continued for 15 minutes. The reaction mixture is worked up as described in Example 1. A white amorphous solid (66.7 g) is obtained. $^1$H NMR ($\delta$; $CDCl_3$): 1.7 (s, gemdimethyls); 2.5-2.7 (multiplet, $OCH_2$-$\underline{CH_2}$—$CF_2$); 4.6 (t, $O\underline{CH_2}$—$CH_2$—$CF_2$); 7.0 (d, Aromatic protons ortho to end carbonate groups); 7.15-7.25 (2 d, aromatic protons). IR (KBr): 1164.9, 1195.8, 1244.0 (alkyl-$CF_2$); 1768.6 (aryl-O—CO—O-alkyl).

EXAMPLE 3

Preparation of a Fluorocarbon Terminated Oligocarbonate from Hydroxy Terminated Bisphenol A Oligomer (n=11) and a Fluoro Alcohol In a 5 liter reactor assembly 2.5 liter of dichloromethane, 185.9 g of bis (2,4-dinitrophenyl) carbonate and 195.3 g of fluoro alcohol [Zonyl BA-L (®™); Aldrich] is charged and the mixture is stirred at room temperature. Then 51.37 g of triethyl amine in 0.5 liter of dichloromethane is charged slowly into the reaction mixture during 1.5 hours. The reaction mixture is further stirred for one hour and then slowly added to a mixture of 3.0 liter of dichloromethane, 500 g of oligocarbonate (MW=2757), 51.37 g of triethyl amine and 1 g of 4-(dimethylamino) pyridine over a period of 2.15 hours. The reaction mixtue is stirred further for 3 hours. Then dichloromethane is distilled off under vacuum. The residue is stirred with 4 liter of 50% aqueous methanol for 0.5 hour and then filtered. The solid cake is twice washed with 50% aqueous methanol. The wet cake is dried under vacuum at 85° C. to obtain 0.6 kg of the desired product. $^1$H NMR (δ; CDCl$_3$): 1.68 (s, gem-dimethyls); 2.5-2.7 (multiplet, OCH$_2$—CH$_2$—CF$_2$); 4.54 (t, OCH$_2$—CH$_2$—CF$_2$); 7.1 (d, aromatic protons ortho to end carbonate groups); 7.15-7.3 (2 d, aromatic protons). IR (KBr): 1164.9, 1195.8, 1245.9 (alkyl-CF$_2$); 1768.6 (aryl-O—CO—O-alkyl).

EXAMPLE 4

Preparation of a Fluorocarbon Terminated Oligocarbonate from Hydroxy Terminated Bisphenol A Oligomer (n=15) and a Fluoro Alcohol To a solution of 12 g of fluoro alcohol [Zonyl BA-L (®™); Aldrich] and 11.6 g of bis(2,4-di-nitrophenyl)carbonate (DNPC) in 200 ml of dichloromethane is added dropwise a solution of 4.65 ml of triethylamine in 50 ml of dichloromethane at room temperature under stirring during 1 hour. The reaction mixture is further stirred for 15 minutes and then dropped to a solution of 4.65 ml of triethylamine, 0.14 g of 4-(dimethylamino)pyridine and 42.62 g of oligocarbonate (MW=3824) in 250 ml of dichloromethane at room temperature during 1.5 hours.

The stirring is continued for 15 minutes. The reaction mixture is worked up as described in Example 1. The residue gives a white amorphous solid. $^1$H NMR (δ; CDCl$_3$): 1.609 (s, gemdimethyls); 2.48-2.57 (multiplet, OCH$_2$—CH$_2$—CF$_2$); 4.47 (t, OCH$_2$—CH$_2$—CF$_2$); 7.0 (d, aromatic protons ortho to end carbonate groups); 7.082-7.187 (2 d, aromatic protons). IR (KBr): 1164.9, 1195.8, 1250 (alkyl-CF$_2$); 1770.5 (aryl-O—CO—O-alkyl).

EXAMPLE 5

Preparation of a Fluorocarbon Terminated Oligocarbonate from Hydroxy Terminated Bisphenol A Oligomer (n=15) and a Fluoro Alcohol To a solution cof 4.61 g of fluoro alcohol [Zonyl BA-L (®™); Aldrich] and 4.39 g of bis(2,4-dinitrophenyl)carbonate (DNPC) in 125 ml of dichloromethane is added dropwise a solution of 1.65 ml of triethylamine in 10 ml of dichloromethane at room temperature under stirring during 1 hour. The reaction mixture is further stirred for 15 minutes and then dropped to a solution of 1.65 ml of triethylamine, 0.10 g of 4-(dimethylamino)pyridine and 20 g of oligocarbonate (MW=5385) in 125 ml of dichloromethane at room temperature during 2.15 hours. The stirring is stirred over night and worked up as described in the Example 1 to give 21.66 g of a white amorphous solid. $^1$H NMR (δ; CDCl$_3$): 1.609 (s, gem-dimethyls); 2.48-2.57 (multiplet, OCH$_2$—CH$_2$—CF$_2$); 4.47 (t, OCH$_2$—CH$_2$—CF$_2$); 7.0 (d, aromatic protons ortho to end carbonate groups); 7.082-7.187 (2 d, aromatic protons). IR (KBr): 1164.9, 1195.8, 1250 (alkyl-CF$_2$); 1770.5 (aryl-O—CO—O-alkyl).

EXAMPLE 6

Preparation of Oligomeric Fluorinated Polycarbonate from Hydroxy Terminated Bisphenol A Oligorner (n=11) and C4 Fluoro Alcohol To 19.96 g of fluoro alcohol and 39.33 g of DNPC in 500 ml of dichloromethane is added under stirring a solution of 10.87 g of triethylamine in 50 ml of dichloromethane dropwise over a period of one hour at room temperature. The reaction is further stirred for 30 minutes. The reaction mass is then transferred to an addition funnel and added dropwise to the solution of oligomer (mw=2605.9; 100 gms) in dichloromethane (500 ml), triethylamine (10.87 g) and 4-(dimethylamino) pyridine (0.27 g) at room temperature over a period of 2.5 hours. The reaction mass is allowed to stir further for 3 hours. The reaction is then worked up as described in Example 1. A white amorphous solid is obtained. $^1$H NMR (δ; CDCl$_3$): 1.7 (s, gem-dimethyl); 4.7 (multiplet, OCH$_2$—CF$_2$); 7.1 (d, aromatic protons ortho to end carbonate groups); 7.15-7.25 (2 d, aromatic protons). IR (KBr): 1164.9, 1195.8, 1244.0 (al-CF$_2$); 1770.5 (ar-O—CO—O-al).

EXAMPLE 7

Preparation of Oligomeric Fluorinated Polycarbonate from Hydroxy Terminated Bisphenol Z Oligomer (n=9) and Fluoro Alcohol In a 5-lit reactor assembly 3.0 liter of dichloromethane, 288.06 g of bis (2,4-dinitrophenyl) carbonate and 324.22 g of fluoro alcohol are charged and the mixture is stirred at room temperature. 79.63 g of triethylamine in 0.5 liter of dichloromethane is charged slowly into the mixture during 1.5 hour. The reaction mass is further stirred for 1 hour and slowly added to a mixture of 3.5 liter of dichloromethane, oligomer (n=9; 700 g), triethyl amine (79.63 g) and 4-(dimethylamino) pyridine (1.99 g) over a period of 2.5 hour. The reaction mass is stirred further for 3 hours and then washed first with 1 N HCl (3.5 kg) & then with 0.5 N NaOH (4×3.5 kg). Finally, the reaction mixture is washed again with 1N HCl (3.5 kg) followed by water (7.4 kg). The organic layer is separated and evaporated under vacuum. The residue is stirred with methanol (3.0 liter) & afterwards with hexane (3.0 liter). The wet cake is dried under vacuum at 40° C. to obtain the desired compound. $^1$H NMR (δ, CDCl$_3$): 1.6-1.8 (multiplet, —CH$_2$—CH$_2$—CH$_2$—CH$_2$—CH$_2$); 2.2-2.4 (s,

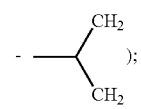

2.5-2.7 (multiplet, OCH$_2$—CH$_2$—CF$_2$); 4.54 (t, —OCH$_2$—CH$_2$—CF$_2$); 7.1 (d, aromatic protons ortho to end carbonate groups); 7.15-7.3 (2 d, aromatic protons). IR (KBr): 1161.9, 1197.7, 1226.6 (al-$CF_2$); 1772.5 (ar-O—CO—O-al).

EXAMPLE 8

Preparation of Oligomeric Fluorinated Polycarbonate from Hydroxy Terminated Bisphenol A Oligomer (n=1) and C8 Fluoro Alcohol To a solution of 5.07 g (11.4 mmol) of fluoro alcohol [Zonyl BA-L (®™); Aldrich] and 5.00 g (12.7 mmol) of bis(2,4-dinitrophenyl)carbonate (DNPC) in 100 ml of dichloromethane is added dropwise a solution of 1.8 ml (12.7 mmol) of triethylamine in 30 ml of dichloromethane at room temperature. The reaction mixture is further stirred for 15 minutes and then dropped to a solution of 2.0 ml (14.6 mmol) of triethylamine, 53 mg of 4-(dimethylamino)pyridine (DMAP) and 0.99 g (4.20 mmol) of bisphenol A in 80 ml of dichloromethane at room temperature. The reaction mixture is stirred for 12 hours at room temperature. The solvent is then evaporated. The residue is dissolved in diethyl ether/tetrahydrofuran and the organic phase is washed repeatedly with water and brine, dried over $MgSO_4$, filtered and concentrated using a vacuum rotary evaporator to give 6.00 g of an orange solid. This crude material is purified by flash chromatography (hexane/diethyl ether. 2:1) to give a wet solid which is recrystallized from hexane/diethyl ether to give the desired compound, white solid, m.p. 100-102° C. $^1$H NMR: (400 MHz, $CDCl_3$): δ=7.30-7.20 (m, ArH, 4H); 7.15-7.05 (m, ArH, 4H); 4.57 (t, J=6.4 Hz, $OCH_2CH_2CF_2$, 4H); 2.70-2.52 (m, $OCH_2CH_2CF_2$, 4H); 1.70 (s, $CH_3$, 6H).

EXAMPLE 9

Preparation of Oligomeric Fluorinated Polycarbonate from Hydroxy Monoterminated Bisphenol A Oligomer (n=11) and C8 Fluoro Alcohol Fluoro alcohol (9.765 g), DNPC (9.29 g) in dichloromethane (250 ml) is taken in a 500 ml round bottomed flask and triethyl amine (2.57 ml) dissolved in dichloromethane (25 ml) is added dropwise to the reaction mass over a period of 1 hour at room temperature under stirring. The reaction is further stirred for 15 minutes. The reaction mass is then transferred to the addition funnel and added dropwise to the the solution of oligomer (n=11; 50 gms) in dichloromethane (250 ml), triethylamine (2.57 ml) and 4-(dimethylamino) pyridine (0.14 gm) at room temperature over a period of 1.5 hour. The reaction mixture is allowed to stir further for 15 minutes. The reaction mixture is evaporated under vacuum. The residue is stirred with aqueous methanol (400 ml; 50%) for half an hour and then filtered. The solid cake is twice washed with aqueous methanol (50%). The wet cake is dried under vacuum to give the desired compound. $^1$H NMR (δ; $CDCl_3$): 1.68 (s, gem-dimethyl); 2.5-2.7 (m, $OCH_2$—$CH_2$—$CF_2$); 4.54 (t, $OCH_2$—$CH_2$—$CF_2$); 7.1 (d, aromatic protons ortho to end carbonate groups); 7.15-7.3 (2 d, aromatic protons). IR (KBr): 1164.9, 1195.8, 1245.9 (al-$CF_2$); 1768.6 (ar-O—CO—O-al).

EXAMPLE 10

Preparation of Oligomeric Fluorinated Polycarbonate from Hydroxy Terminated Trisphenol A Oligomer and C8 Fluoro Alcohol In a 1 liter reactor assembly 0.2 liter of dichloroethane, 47.6 g of bis (2,4-dinitrophenyl) carbonate and 50 g of fluoro alcohol is charged and the mixture is stirred at room temperature. Then 14.66 g of triethyl amine dissolved in 0.1 liter of dichloroethane is charged slowly into the reaction mixture during 1 hour. The reaction mixture is further stirred for 0.25 hour. This reaction mixture is diluted with 0.1 liter of dichloromethane and then slowly added to a mixture of 0.3 liter of dichloroethane, 0.1 liter of dichloromethane, 11.1 g of from 1,1,1-tris(4-hydroxyphenyl)ethane, 14.661 g of triethyl amine and 0.2 g of 4-(dimethylamino) pyridine over a period of 1.5 hours. The reaction mixture is stirred further for 14 hours. Then the reaction mixture is filtered and residual particles are washed with 0.3 liter of dichloroethane.

The wet residue is dried under vacuum at 85° C. to obtain the desired product. $^1$H NMR (δ; $CDCl_3$): 2.164 (s, methyl); 2.5-2.7 (multiplet, $OCH_2$—$CH_2$—$CF_2$); 4.55 (t, $OCH_2$—$CH_2$—$CF_2$); 7.094 (s, aromatic protons); IR (KBr): 1149.5, 1248 (alkyl-$CF_2$); 1762.8 (aryl-O—CO—O-alkyl).

EXAMPLE 11

Processing of Polycarbonate Tapes Containing the Fluorocarbon Terminated Oligo- and Poly-Carbonates In order to evaluate the surface properties of the new compounds of the formula I in polycarbonate tapes, they are incorporated in the polymer according to the following procedure:

A polycarbonate powder [Makrolon 3108 FBL (®™) from Bayer] is dried in a vacuum oven for eight hours at 120° C. Appropriate amounts of each compound of the formula I is added to the dried polycarbonate powder to obtain formulations containing 0.5 up to 10% by weight of the compound of the formula I. The formulations are mixed in a turbo mixer and extruded in a twin-screw extruder (Poly-Lab extruder from Thermo Haake) equipped with a flat die. In this way, polycarbonate tapes are produced with a width of 20 mm and a thickness of around 1 mm. The processing temperature is around 280° C. All produced tapes have a transparent visual appearance.

The contact angle of the produced polycarbonate tapes are measured with a Dataphysics OCA 30 contact angle device, using the sessile drop method and water as measuring liquid. The obtained results are summarized in Table 1.

TABLE 1

| Example | Additive | Contact angle (°) |
|---|---|---|
| 11a[a)] | none | 85.7° |
| 11b[b)] | 5.0% Example 1 | 109.3° |
| 11c[b)] | 5.0% Example 2 | 105.7° |
| 11d[b)] | 0.5% Example 3 | 93.5° |
| 11e[b)] | 1.0% Example 3 | 100.2° |
| 11f[b)] | 3.0% Example 3 | 102.8° |
| 11g[b)] | 5.0% Example 3 | 105.7° |
| 11h[b)] | 10.0% Example 3 | 108.8° |
| 11g[b)] | 5.0% Example 5 | 99.8° |

[a)]Comparison Example.
[b)]Example according to the invention.

EXAMPLE 12

Processing of Polycarbonate Tapes Containing the Fluorocarbon Terminated Oligo- and Poly-Carbonates and Surface Properties Processing: A polycarbonate powder [Makrolon 3108 FBL (®) from Bayer] is dried in a vacuum oven for eight hours at 120° C. Appropriate amounts of each compound of the formula I is added to the dried polycarbonate powder to obtain formulations containing up to 10% by weight of the compound of the formula I. The formulations are mixed in a turbo mixer and extruded in a twin-screw extruder (Poly-Lab extruder from Thermo Haake) equipped with a flat die. In this way, polycarbonate tapes are produced with a width of 20 mm and a thickness of around 1 mm. The processing temperature is around 280° C. All produced tapes have a transparent visual appearance.

Contact Angle measurements: The contact angle of the produced polycarbonate tapes are measured with a Dataphysics OCA 30 contact angle device, using the sessile drop method and water as measuring liquid. The results are summarized in Tables 2 and 3.

TABLE 2

| Example | Additive | Contact angle (°) |
|---|---|---|
| 12a[a] | none | 82.2 |
| 12b[b] | 2% Example 6 | 84.1 |
| 12c[b] | 6% Example 6 | 89.2 |
| 12d[b] | 10% Example 6 | 89.9 |

TABLE 3

| Example | Additive | Contact angle (°) |
|---|---|---|
| 12e[a] | none | 80.0 |
| 12f[b] | 1% Example 7 | 97.8 |
| 12g[b] | 5% Example 7 | 108.5 |

[a]Comparison Example.
[b]Example according to the invention.

EXAMPLE 13

Processing of PET Tapes Containing Fluorocarbon Terminated Oligo- and Poly-Carbonates In order to evaluate the surface properties of the new compounds of the formula I in PET tapes, they are incorporated in the polymer according to the following procedure:

A PET powder [Polyclear 1101 (Kosa) or Eastar 6763 (Eastman)] is dried in a vacuum oven for eight hours at 120° C. Appropriate amounts of each compound of the formula I is added to the dried polycarbonate powder to obtain formulations containing 1 up to 5% by weight of the compound of the formula I. The formulations are mixed in a turbo mixer and extruded in a twin-screw extruder (Poly-Lab extruder from Thermo Haake) equipped with a flat die. In this way, PET tapes are produced with a width of 20 mm and a thickness of around 1 mm. The processing temperature is around 260° C. All produced tapes have a transparent visual appearance. The contact angle of the produced PET tapes are measured with a Dataphysics OCA 30 contact angle device, using the sessile drop method and water as measuring liquid for the following additive example and PET types e.g. PET type: Polyclear 1101 (Kosa) or PET-G type: Eastar 6763 (Eastman). The results are summarized in Table 4.

TABLE 4

| Example | Additive | PET type | Contact angle (°) |
|---|---|---|---|
| 13a[a] | none | Polyclear 1101 (Kosa) | 85.0 |
| 13b[b] | 1% Example 3 | Polyclear 1101 (Kosa) | 99.3 |

TABLE 4-continued

| Example | Additive | PET type | Contact angle (°) |
|---|---|---|---|
| 13c[b] | 5% Example 3 | Polyclear 1101 (Kosa) | 108.1 |
| 13d[a] | none | Eastar 6763 (Eastman) | 71.5 |
| 13e[b] | 5% Example 3 | Eastar 6763 (Eastman) | 108.7 |

[a]Comparison Example.
[b]Example according to the invention.

EXAMPLE 14

Repellency Properties of Polypropylene (PP) Non Wovens Containing the Fluoro-Carbon Terminated Oligo- and Poly-Carbonates In order to evaluate the repellency properties of the new compounds of the formula I in PP non wovens, they are incorporated in the polymer according to the following procedure:

A concentrate of the compounds of the formula I is made in polypropylene. The PP used is PP3505 from ExxonMobil (melt flow rate 400 g/10 min). Appropriate amounts of each compound are added to the PP to obtain 10% active compound as a concentrate. The concentrate is mixed by tumbling and then extruded in a twin-screw extruder (Leistritz MIC 27/GL-32D). The zone temperatures are 125, 150, 175, 175 and 175° C. to last zone. The melt ternperature is measured and is 185° C. The residence time is 60 seconds. The screws RPM is adjusted to obtain a production rate of 100 g/minute. The molten concentrate mixture exits via a two orifice round die. The molten material is immediately cooled and solidified in a cold-water trough. The polymer string is then granulated by a Conair/Jetro 304 pelletizer.

Formulations containing 1 to 2% by weight of the compound are obtained by tumbling the appropriate amount of the 10% concentrate with the appropriate amount of polypropylene. This PP is Exxon Mobil PP3546 (melt flow rate 1200 g/10 min).

Meltblown process: 500 grams of the 1 to 2% mix so obtained is then passed through a 6-inch non-woven melt blowing pilot line. The following conditions were used for the preparation of the meltblown non-wovens: Extrusion temperature profile of 175, 215, 240° C. The adapter and die zones at 240° C. The furnace exit pipes at 205, 220 and 240° C. Air valve open to 15%. Die output of 0.45 g/minute. Die to collector distance of 30 cm. Collector RPM is set to produce a fabric weight of 40 g/m$^2$.

Repellency properties: The produced non-woven samples are evaluated on their water/alcohol repellency behavior similar to INDA (International Non-woven and Disposables Association) test method 80.8 (99). The wetting behavior of the samples is tested with a series of water/isopropanol mixtures. The observation of the wetting behavior is rated from 0 (water wetting, no repellency) to 10 (optimum water repellency). The non-woven samples are evaluated in the oil repellency test similar to AATCC test method 118-1997/ISO 14419. This test follows the same concepts of the already described for water repellency test method, but using, as test solvents, a series of hydrocarbons. The observation of the wetting behavior is rated from 0 (no repellency) to 8 (optimum repellency). The samples are evaluated without thermal treatment and after a thermal treatment (e.g. 130° C. for 10 minutes). The results are summarized in Table 5.

TABLE 5

| Example | Additive | Treatment | Water Repellency Rating | Oil Repellency Rating |
|---|---|---|---|---|
| 14a[a] | none | Non woven without heat treat | 2 | 0 |
| 14b[a] | none | After heat treat 130° C./10 min. | 3 | 0 |
| 14c[b] | 1% Example 3 | Non woven without heat treat | 3 | 0 |
| 14d[b] | 1% Example 3 | After heat treat 130° C./10 min. | 8 | 1 |
| 14e[b] | 2% Example 3 | Non woven without heat treat | 4 | 0 |
| 14f[b] | 2% Example 3 | After heat treat 130° C./10 min. | 8 | 3 |

[a]Comparison Example.
[b]Example according to the invention.

TABLE 6

| Example | Additive | Treatment | Water Repellency Rating | Oil Repellency Rating |
|---|---|---|---|---|
| 15a[a] | none | Fabric without heat treat | 2 | 0 |
| 15b[a] | none | After heat treat 130° C./10 min. | 3 | 0 |
| 15c[b] | 1% Example 3 | Fabric without heat treat | 4 | 1 |
| 15d[b] | 1% Example 3 | After heat treat 130° C./10 min. | 8 | 5 |
| 15e[b] | 2% Example 3 | Fabric without heat treat | 4 | 1 |
| 15f[b] | 2% Example 3 | After heat treat 130° C./10 min. | 9 | 6 |

[a]Comparison Example.
[b]Example according to the invention.

EXAMPLE 15

Repellency Properties of PET Non Wovens Containing Fluorocarbon Terminated Oligo- and Poly-Carbonates In order to evaluate the repellency properties of the new compounds of the formula I in PET non wovens, they are incorporated in the polymer according to the following procedure:

Compounding: The PET used is PermaClear 61458 from Wellman. The PET is dried overnight at 120° C. in a vacuum drying oven. Appropriate amounts of each compound of the formula I are added to the previously dried PET powder to obtain formulations containing 1 to 2% by weight of the compound of the formula I. The formulations are mixed in a turbo mixer and extruded in a twin-screw extruder (Poly-Lab extruder from Thermo Haake). The polymer string is then granulated. The obtained granulates are dried overnight again at 120° C. in a vacuum drying oven. The granulates are then passed through a 6-inch melt blowing pilot line. The following conditions for the preparation of the meltblown nonwovens are used: Extrusion temperature profile of 235, 280 and 305° C. The adapter and die zones at 305° C. The furnace exit pipes at 285, 300 and 315° C. Air valve open to 15%. Die output of 0.45 g/minute. Die to collector distance of 30 cm. Collector RPM is set to produce a fabric weight of 40 g/m².

The produced nonwoven samples are evaluated on their water/alcohol repellency behavior similar to INDA (International Nonwoven and Disposables Association) test method 80.8 (99). The wetting behavior of the samples is tested with a series of water isopropanol mixtures. The observation of the wetting behavior is rated from 0 (water wetting, no repellency) to 10 (optimum water repellency). The non wovens samples are evaluated in the oil repellency test similar to AATCC test method 118-1997/ISO 14419. This test follows the same concepts of the already described for water repellency test method, but using, as test solvents, a series of hydrocarbons. The observation of the wetting behavior is rated from 0 (no repellency) to 8 (optimum repellency). The samples are evaluated without thermal treatment and after a thermal treatment (e.g. 130° C. for 10 minutes). The results are summarized in Table 6.

EXAMPLE 16

Repellency Properties of Polypropylene Fibers Containing Fluorocarbon Terminated Oligo- and Poly-Carbonates In order to evaluate the repellency properties of the new compounds of the formula I in polypropylene fibers, they are incorporated in the polymer according to the following procedure:

Fiber grade polypropylene is dried overnight at 60° C. in a vacuum drying oven. Appropriate amounts of each compound of the formula I are added to the previously dried polypropylene powder to obtain formulations containing 1 to 5% by weight of the compound of the formula I. The formulations are mixed in a turbo mixer and extruded in a twin-screw extruder (Poly-Lab extruder from Thermo Haake). The polymer string is then granulated. The granulates obtained are dried again overnight at 60° C. in a vacuum drying oven. The granulates are then processed through a fiber extruder Spinboy II to produce fibers of Denier 3.0. The fibers are then further knitted to socks using a sock-knitting machine.

The socks are evaluated on their water/alcohol repellency behavior similar to INDA (International Nonwoven and Disposables Association) test method 80.8 (99). The wetting behavior of the samples is tested With a series of water/ isopropanol mixtures. The observation of the wetting behavior is rated from 0 (water wetting, no repellency) to 10 (optimum water repellency). The samples are evaluated after a thermal treatment (e.g. 130° C. for 10 minutes). The results are summarized in Table 7.

TABLE 7

| Example | Additive | Water Repellency Rating |
|---|---|---|
| 16a[a] | none | 0 |
| 16b[b] | 1% Example 3 | 2 |
| 16c[b] | 3% Example 3 | 3 |
| 16d[b] | 5% Example 3 | 3 |

[a]Comparison Example.
[b]Example according to the invention.

EXAMPLE 17

Water and Oil Repellency Properties of Fluorocarbon Terminated Oligo- and Poly-Carbonates in Polypropylene In order to determine the repellency properties of the compounds of the formula I, an Industrial sample of polypropylene nonwoven, fabric weight: 40 g/m², is dipped into a 1% isopropanol solution of the test compound, simultaneously applying ultrasonic energy for one minute. After that, the sample is dried overnight at room temperature and then two hours at 90° C. in an oven.

The treated nonwoven samples are evaluated in the water repellency test similar to INDA test method 80.8 (99). The wetting behavior of the nonwovens is tested with a series of water/isopropanol mixtures. The observation of the wetting behavior is rated from 0 (water wetting, no repellency) to 10 (optimum water repellency). The treated nonwoven samples are evaluated in the oil repellency test similar to AATCC test method 118-1997/ISO 14419. This test follows the same concepts of the already described for water repellency test method, but using, as test solvents, a series of hydrocarbons. The observation of the wetting behavior is rated from 0 (no repellency) to 8 (optimum repellency). The samples are evaluated without further thermal treatment and after a thermal treatment (e.g. 130° C. for 10 minutes). The results are summarized in Table 8.

TABLE 8

| Example | Additive | Treatment | Water Repellency Rating | Oil Repellency Rating |
|---|---|---|---|---|
| 17a[a] | none | Fabric without heat treat | 2 | 0 |
| 17b[a] | none | After heat treat 130° C./10 min. | 2 | 0 |
| 17c[b] | Example 3 | Fabric without heat treat | 9 | 6 |
| 17d[b] | Example 3 | After heat treat 130° C./10 min. | 9 | 6 |
| 17e[b] | Example 1 | Fabric without heat treat | 10 | 7 |
| 17f[b] | Example 1 | After heat treat 130° C./10 min. | 10 | 7 |
| 17g[b] | Example 8 | Fabric without heat treat | 9 | 5 |
| 17h[b] | Example 8 | After heat treat 130° C./10 min. | 10 | 5 |

[a]Comparison Example.
[b]Example according to the invention.

What is claimed is:

1. A composition comprising
an extruded blend of
a) an organic material which is susceptible to oxidative, thermal or light-induced degradation, and
b) at least one compound of the formula I

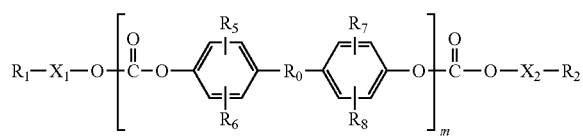

(I)

wherein

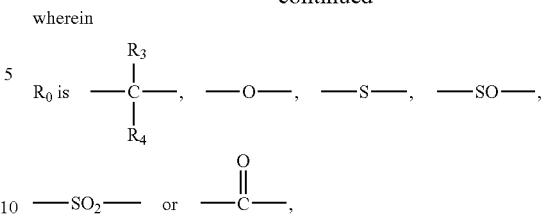

$R_1$ and $R_2$ are each independently —$(CF_2)_pF$, wherein p is 4 to 15, $R_3$ and $R_4$ are each independently of the other hydrogen, a fluorine containing group, $C_1$-$C_{12}$alkyl, phenyl or

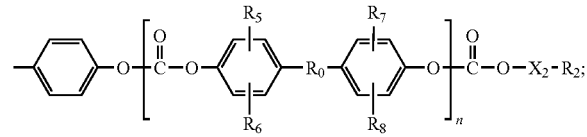

or $R_3$ and $R_4$, together with the carbon atom to which they are bonded, form a $C_5$-$C_8$-cycloalkylidene ring that is unsubstituted or substituted by from 1 to 3 $C_1$-$C_4$alkyl groups; $R_5$, $R_6$, $R_7$ and $R_8$ are each independently of the other hydrogen, $C_1$-$C_{12}$alkyl or $C_3$-$C_{12}$alkenyl, $X_1$ and $X_2$ are each independently of the other a direct bond or $C_1$-$C_{12}$alkylene, m is 1 to 10'000, and n is 0 to 10'000; and where the organic material is polyester, polyacrylate, polymethacrylate or polypropylene.

2. A composition according to claim 1 wherein component (b) is present in an amount of from 0.1 to 20%, based on the weight of component (a).

3. A composition according to claim 1, comprising in addition, besides components (a) and (b), further additives.

4. A composition according to claim 3, comprising as further additives phenolic antioxidants, light-stabilizers and/or processing stabilizers.

5. A process for reducing the surface energy of organic materials which comprises incorporating therein via extrusion a compound of the formula I

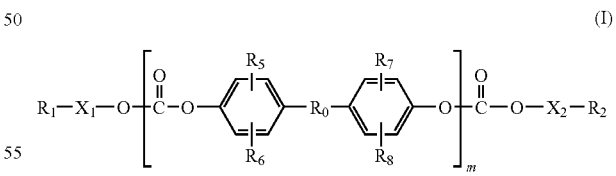

(I)

wherein

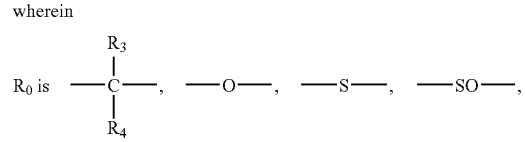

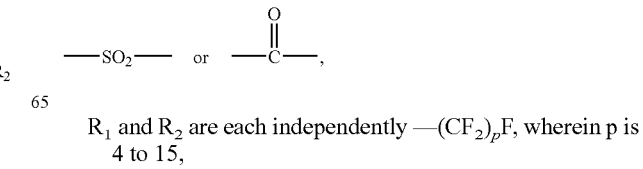

$R_1$ and $R_2$ are each independently —$(CF_2)_pF$, wherein p is 4 to 15,

R$_3$ and R$_4$ are each independently of the other hydrogen, a fluorine containing group, C$_1$-C$_{12}$alkyl, phenyl or

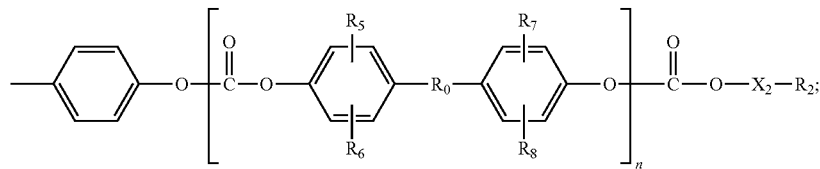

or R$_3$ and R$_4$, together with the carbon atom to which they are bonded, form a C$_5$-C$_8$-cycloalkylidene ring that is unsubstituted or substituted by from 1 to 3 C$_1$-C$_4$alkyl groups; R$_5$, R$_6$, R$_7$ and R$_8$ are each independently of the other hydrogen, C$_1$-C$_{12}$alkyl or C$_3$-C$_{12}$alkenyl, X$_1$ and X$_2$ are each independently of the other a direct bond or C$_1$-C$_{12}$alkylene, m is 1 to 10'000, and n is 0 to 10'000; and where the organic materials are polyester, polyacrylate, polymethacrylate or polypropylene.

6. A composition according to claim 1, where in the compounds of formula I, R$_0$ is

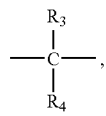

R$_3$ and R$_4$ are each independently of the other hydrogen, CF$_3$, C$_1$-C$_{12}$alkyl, phenyl or

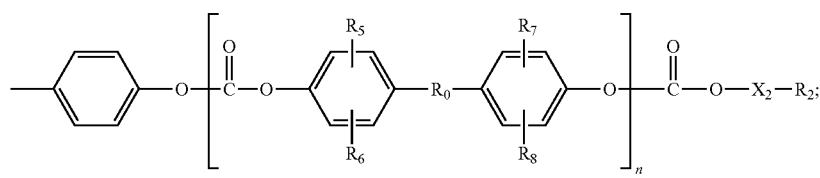

or R$_3$ and R$_4$, together with the carbon atom to which they are bonded, form a C$_5$-C$_8$-cycloalkylidene ring that is unsubstituted or substituted by from 1 to 3 C$_1$-C$_4$alkyl groups;

R$_5$, R$_6$, R$_7$ and R$_8$ are hydrogen,

X$_1$ and X$_2$ are each independently of the other C$_1$-C$_{12}$alkylene, m is 1 to 10'000, and n is 0 to 10'000.

7. A composition according to claim 1, where in the compounds of formula I, R$_0$ is

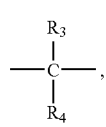

R$_3$ is hydrogen, CF$_3$, C$_1$-C$_{12}$alkyl, phenyl or

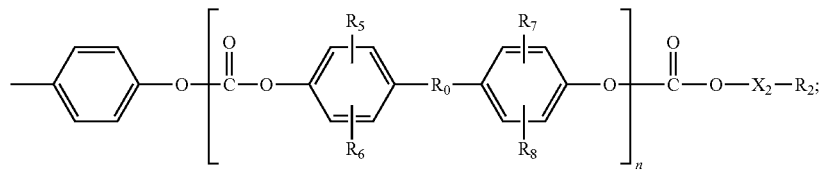

$R_4$ is hydrogen, $CF_3$, $C_1$-$C_{12}$alkyl or phenyl;

or $R_3$ and $R_4$, together with the carbon atom to which they are bonded, form a $C_5$-$C_8$-cycloalkylidene ring that is unsubstituted or substituted by from 3 $C_1$-$C_4$alkyl groups;

$R_5$, $R_6$, $R_7$ and $R_8$ are hydrogen, $X_1$ and $X_2$ are each independently of the other $C_1$-$C_{12}$alkylene, m is 1 to 10'000, and n is 0 to 10'000.

8. A composition according to claim 1, where in the compounds of formula I, $R_0$ is

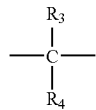

and $R_3$ and $R_4$ are each independently of the other hydrogen or $C_1$-$C_4$alkyl or $R_3$ and $R_4$, together with the carbon atom to which they are bonded, form a cyclohexylidene ring.

9. A composition according to claim 1, where in the compounds of formula I, $X_1$ and $X_2$ are each independently of the other $C_2$-$C_8$alkylene.

10. A composition according to claim 1, where in the compounds of formula I, m is 1 to 50, and n is 0 to 50.

11. A composition according to claim 1, where in the compounds of formula I, $R_0$ is

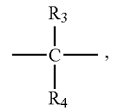

$R_3$ and $R_4$ are each independently of the other $C_1$-$C_4$alkyl;

or $R_3$ and $R_4$, together with the carbon atom to which they are bonded, form a cyclohexylidene ring;

$R_5$, $R_6$, $R_7$ and $R_5$ are hydrogen, $X_1$ and $X_2$ are ethylene, m is 2 to 50, n is 0 to 50, and p is 4 to 15.

* * * * *